(12) United States Patent
Sugasaki

(10) Patent No.: US 8,618,208 B2
(45) Date of Patent: Dec. 31, 2013

(54) RESIN COMPOSITION FOR LASER ENGRAVING, RELIEF PRINTING PLATE PRECURSOR FOR LASER ENGRAVING AND PROCESS FOR PRODUCING THE SAME, AND RELIEF PRINTING PLATE AND PROCESS FOR MAKING THE SAME

(75) Inventor: Atsushi Sugasaki, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/305,518

(22) Filed: Nov. 28, 2011

(65) Prior Publication Data

US 2012/0135196 A1    May 31, 2012

(30) Foreign Application Priority Data

Nov. 29, 2010 (JP) ................................. 2010-265409

(51) Int. Cl.
  *C08F 8/00* (2006.01)
  *C09B 67/00* (2006.01)
  *B32B 3/00* (2006.01)

(52) U.S. Cl.
  USPC ............. 524/502; 428/156; 525/55; 525/299; 264/400; 264/494

(58) Field of Classification Search
  USPC ................... 428/156; 525/55, 100, 299, 107; 524/502; 264/494, 400
  See application file for complete search history.

(56) References Cited

U.S. PATENT DOCUMENTS

| | | | |
|---|---|---|---|
| 4,916,186 A * | 4/1990 | Burk et al. ....................... 525/71 |
| 5,292,617 A * | 3/1994 | Feinberg et al. ............ 430/271.1 |
| 6,268,440 B1 * | 7/2001 | Kudo et al. .................... 525/477 |
| 6,355,395 B1 * | 3/2002 | Zwez et al. ................. 430/271.1 |
| 2002/9123541 * | 9/2002 | Hughes ........................... 524/13 |
| 2009/0081414 A1 * | 3/2009 | Sugasaki ....................... 428/172 |
| 2009/0093584 A1 * | 4/2009 | Gelles et al. .................. 524/505 |
| 2009/0246469 A1 * | 10/2009 | Kawashima et al. .......... 428/156 |
| 2011/0293896 A1 * | 12/2011 | Sugasaki .................... 428/195.1 |
| 2011/0311776 A1 * | 12/2011 | Sugasaki et al. .............. 428/156 |
| 2012/0024224 A1 * | 2/2012 | Kanchiku et al. ............... 118/46 |

FOREIGN PATENT DOCUMENTS

| | | |
|---|---|---|
| JP | 2002-214792 A | 7/2002 |
| JP | 2005-534525 A | 11/2005 |
| JP | 2007-148322 A | 6/2007 |
| JP | 2007-520379 A | 7/2007 |
| JP | 2010-069763 A | 4/2010 |
| JP | 2010-222591 A | 10/2010 |
| JP | 2001-523181 A | 11/2011 |
| WO | 98/50231 | 11/1998 |
| WO | WO 2006/051863 A1 | 5/2006 |

OTHER PUBLICATIONS

Office Action dated Oct. 16, 2012 on Japanese Application No. JP 2010-265409.

* cited by examiner

*Primary Examiner* — Hannah Pak

(74) *Attorney, Agent, or Firm* — Sughrue Mion, PLLC

(57) ABSTRACT

Disclosed are a resin composition for laser engraving, including an acrylic block copolymer; a relief printing plate precursor for laser engraving comprising a relief-forming layer formed from the resin composition on a support; a process for producing the relief printing plate precursor; a process of making a relief printing plate using the relief printing plate precursor; and a relief printing plate having a relief layer which is manufactured by the process.

18 Claims, No Drawings

RESIN COMPOSITION FOR LASER ENGRAVING, RELIEF PRINTING PLATE PRECURSOR FOR LASER ENGRAVING AND PROCESS FOR PRODUCING THE SAME, AND RELIEF PRINTING PLATE AND PROCESS FOR MAKING THE SAME

TECHNICAL FIELD

The present invention relates to a resin composition for laser engraving, relief printing plate precursor for laser engraving and a process for producing the same, and a relief printing plate and a process for making the same.

BACKGROUND ART

A large number of so-called "direct engraving CTP methods", in which a relief-forming layer is directly engraved by means of a laser are proposed. In the method, a laser light is directly irradiated to a flexographic printing plate precursor to cause thermal decomposition and volatilization by photothermal conversion, thereby forming a concave part. Differing from a relief formation using an original image film, the direct engraving CTP method can control freely relief shapes. Consequently, when such image as an outline character is to be formed, it is also possible to engrave that region deeper than other regions, or, in the case of a fine halftone dot image, it is possible, taking into consideration resistance to printing pressure, to engrave while adding a shoulder. With regard to the laser for use in the method, a high-power carbon dioxide laser is generally used. In the case of the carbon dioxide laser, all organic compounds can absorb the irradiation energy and convert it into heat. On the other hand, inexpensive and small-sized semiconductor lasers have been developed, wherein, since they emit visible lights and near infrared lights, it is necessary to absorb the laser light and convert it into heat.

As a conventional resin composition for laser engraving, those described in International Patent Application WO 2006/051863, JP-A-2007-148322 (JP-A denotes a Japanese unexamined patent application publication), JP-A-2005-534525, JP-A-2010-69763 or JP-A-2007-520379 are known. As a conventional resin composition for solvent development, those described in JP-A-2010-222591 are known.

SUMMARY OF THE INVENTION

It is an object of the present invention to provide a resin composition for laser engraving having excellent engraving sensitivity, a relief printing plate precursor using the resin composition for the laser engraving, a process for producing a relief printing plate using the relief printing plate precursor, and the relief printing plate obtained by the process for producing the same, which can obtain a relief printing plate having excellent printing durability.

The above problems of the present invention were solved by the following means <1>, <9>, <10>, <12>, <14>, and <16>. Preferable embodiments <2> to <8>, <11>, <13>, <15>, <17> and <18> are listed.

<1> A resin composition for laser engraving including (Component A) an acrylic block copolymer, <2> the resin composition for laser engraving according to <1>, further including (Component B) a crosslinking agent and (Component C) a crosslinking catalyst, <3> the resin composition for laser engraving according to <1> or <2> further including (Component D) a photothermal conversion agent which can absorb light with a wavelength of 700 to 1,300 nm, <4> the resin composition for laser engraving according to any one of <1> to <3>, further including (Component E) a plasticizer, <5> the resin composition for laser engraving according to <2>, wherein Compound B is a compound having a hydrolyzable silyl group and/or a silanol group, <6> the resin composition for laser engraving according to <2>, wherein Component B is a polyfunctional ethylenically unsaturated compound, <7> the resin composition for laser engraving according to <2>, wherein Component B is a compound which has two or more cyclic structures selected from the group consisting of an epoxy ring, an oxetane ring, and a 5-membered carbonate ring, <8> the resin composition for laser engraving according to any one of <1> to <7>, wherein among the two or more glass transition temperatures which exist in Component A, at least one is less than 25° C., <9> a relief printing plate precursor for laser engraving including a relief-forming layer formed from the resin composition for laser engraving according to any one of <1> to <8> on a support, <10> the relief printing plate precursor for laser engraving including a crosslinked relief-forming layer formed by crosslinking a relief-forming layer formed from the resin composition for laser engraving according to any one of <1> to <8> by light and/or heat on a support, <11> the relief printing plate precursor for laser engraving according to <10> wherein the crosslinked relief-forming layer is a crosslinked relief-forming layer which is crosslinked by heat, <12> a process for producing the relief printing plate precursor for laser engraving including: a layer formation step of forming a relief-forming layer from the resin composition for laser engraving according to any one of <1> to <8>; and a crosslinking step of crosslinking the relief-forming layer by light and/or heat to thus obtain a relief printing plate precursor having a crosslinked relief-forming layer, <13> the process for producing the relief printing plate precursor for laser engraving according to <12> wherein the crosslinking step is a step of crosslinking the relief-forming layer by heat to thus obtain a relief printing plate precursor having a crosslinked relief-forming layer, <14> a process for making a relief printing plate including a layer formation step of forming a relief-forming layer from the resin composition for laser engraving according to any one of <1> to <13>; a crosslinking step of crosslinking the relief-forming layer by light and/or heat to thus obtain a relief printing plate precursor having a crosslinked relief-forming layer; and an engraving step of laser-engraving the relief printing plate precursor having the crosslinked relief-forming layer to form a relief layer, <15> the process for making a relief printing plate according to <14> wherein the crosslinking step is a step of crosslinking the relief-forming layer by heat to thus obtain a relief printing plate precursor having the crosslinked relief-forming layer, <16> A relief printing plate having a relief layer which is manufactured by the making method according to <14> or <15>, <17> the relief printing plate according to <16> wherein the thickness of the relief layer is at least 0.05 mm but no greater than 10 mm, <18> the relief printing plate according to <16> or <17> wherein Shore A hardness of the relief layer at 25° C. is at least 50° but no greater than 90°.

DESCRIPTION OF EMBODIMENTS

Resin Composition for Laser Engraving

A resin composition for laser engraving of the present invention (hereinafter, also simply called "resin composition") includes (Component A) an acrylic block copolymer.

A conjugated diene-based block copolymer and so on used for the conventional resin composition for laser engraving, which is described in WO 2005/051863, JP-A-2007-148322, and JP-A-2005-534525, is used for a binder in the field of flexographic printing as well as the engraving type flexo in order to give a flexible and tough film suitable for flexographic printing, even if the film is formed by itself. However, the thermal decomposition temperature is high (300° C. or higher), so in use for an engraving type relief printing plate precursor, it had a problem in that the engraving sensitivity was low and the productivity of the engraved relief printing plate was low.

On the other hand, although an acrylic resin can be considered as a resin which has a high thermal decomposition property (thermal decomposition temperature is low), the acrylic resin obtained by random copolymerization which is described in JP-A-2010-69763 has a fault, like brittleness being high and so on, and since printing durability is low, when used for flexographic printing, it is difficult to obtain a preferable result.

Although microbubbles or microballs which collapse at the time of laser engraving are put in as an additive agent using a conjugated diene-based block copolymer (SBS block polymer and SIS block polymer) and there is also a report (JP-A-2007-520379) which is going to be compatible in membranous rubber elasticity and intensity, and engraving sensitivity, it is hard to say that a sufficient engraving sensitivity improvement effect has been obtained.

Here, as a result of extensive studies by conducted by the inventor, by using an acrylic block copolymer as a binder, while maintaining the high thermal decomposition property which derives from an acrylic resin skeleton (thermal decomposition temperature is low), the flexible rubber elasticity which was not obtained by random copolymerization was revealed by carrying out block copolymerization, and it was found that compatibility of flexible rubber elasticity suitable for flexographic printing and high engraving sensitivity could be enabled.

Furthermore, it was found that rubber elasticity could be raised further, and printing durability and ink transfer properties are improved, and that the rinsing properties of engraving residue also is improved by combining with a specific crosslinking agent.

In the present invention, the notation 'lower limit to upper limit' expressing a numerical range means 'at least the lower limit but no greater than the upper limit', and the notation 'upper limit to lower limit' means 'no greater than the upper limit but at least the lower limit'. That is, they are numerical ranges that include the upper limit and the lower limit. Further, "(Component A) an acrylic block copolymer" etc. are simply called "Component A" etc.

The resin composition for laser engraving of the present invention may widely be applied to other applications without particular limitations, in addition to the application of the relief-forming layer of a relief printing plate precursor to be subjected to laser engraving. For example, it may be applied not only to the relief-forming layer of a printing plate precursor that is subjected to raised relief formation by laser engraving, which will be described in detail below, but also to the formation of other products in which asperities or openings are formed on the surface, for example, various printing plates and various formed bodies in which images are formed by laser engraving such as an intaglio plate, a stencil plate and a stamp.

Among them, a preferred embodiment is use in formation of a relief-forming layer provided above an appropriate support.

In the present specification, when a relief printing plate precursor is explained, a layer that comprises Component A, that serves as an image-forming layer subjected to laser engraving, that has a flat surface, and that is an uncrosslinked crosslinkable layer is called a relief-forming layer, a layer that is formed by crosslinking the relief-forming layer is called a crosslinked relief-forming layer, and a layer that has asperities formed on the surface by laser engraving the crosslinked relief-forming layer is called a relief layer.

Constituent components of the resin composition for laser engraving are explained below.

(Component A) Acrylic Block Copolymer

The resin composition for laser engraving of the present invention includes (Component A) an acrylic block copolymer.

The "acrylic" of (Component A) the acrylic block copolymer in the present invention means that the block copolymer includes at least one constitutional unit derived from the monomer which is selected from the group consisting of acrylic acid, methacrylic acid, fumaric acid, maleic acid, esters thereof, acrylamide and methacrylamide, and derivatives thereof.

Since Component A is a block copolymer and it is a resin which is made of two or more types of monomers copolymerized in multistage, a glass transition temperature (Tg) is observed only for the number of different types of blocks. Specifically, for example, in the copolymer obtained by carrying out block copolymerization of methyl methacrylate and butyl acrylate, two types such as Tg derived from the poly(butyl acrylate) (PnBA) and Tg derived from the poly(methyl methacrylate) (PMMA) are observed.

Moreover, for example, the glass transition temperature of Component A can be measured by differential scanning calorimetry (DSC measurement).

Among the two or more glass transition temperatures which exist in Component A, it is preferable that at least one be 25° C. or higher.

On the other hand, among the two or more glass transition temperatures which exist in Component A, it is also preferable that at least one be less than 25° C. When at least one of the glass transition temperatures is less than 25° C., since ink transfer properties is improved, it is preferable.

Component A may have two or more types of blocks, and although it may have three or more types of blocks, it preferably has 2 to 4 types, more preferably 2 or 3, and yet more preferably 2 types. Moreover, for example, when it is an A-B-A type block copolymer described later, there are two types of blocks.

Moreover, Component A may have one or more type of acrylic block, further, although it may have a block other than acrylic, such as an aromatic vinyl polymer block, a conjugated diene polymer block, and a hydrogenation conjugated diene polymer block, it is preferred that Component A is a copolymer which includes only two or more types of acrylic blocks.

Moreover, when Component A has two or more blocks which include monomer units of the same type, these may be the same molecular weight (a weight average molecular weight and a number average molecular weight), or different from each other, also, a molecular structure, such as a composition ratio of a monomer unit, an arrangement state, solid arrangement, and a crystal structure, may be the same as or different from each other.

The monomer unit in each block of Component A may be even one type on its own, and it may have two or more types. For example, although each block of Component A may be a homopolymer, or a random copolymer, respectively, it is preferable that each block of Component A be a homopolymer, respectively.

When different types of blocks are represented by A, B, and C, respectively, examples of Component A include a diblock copolymer of A-B type; a triblock copolymer of A-B-A type and A-B-C type; a straight-chain poly block copolymer such as (A-B)$_n$ type and (A-B-)$_n$A type; a star type block copolymer (in the formula, n represents an integer of 2 or more) such as (A-B-)$_n$X type (X represents a residue coupling), (A-B-A)$_n$ X type, and (A-B-C)$_n$X type; a comb type block copolymer and the like.

Component A in the resin composition for laser engraving of the present invention may be used as one type on its own or may be used by mixing of two or more types.

Since Component A has excellent flexibility of the cured resin and production is easy, a triblock copolymer of A-B-A type and a diblock copolymer of A-B type are preferred, and a triblock copolymer of A-B-A type is particularly preferable.

The ratio of the monomer units represented by the following Formula (A-1) in a single block of Component A with respect to the total weight of the block is preferably 80% by weight or more, more preferably 90% by weight or more, and particularly preferably 95 to 100% by weight.

Moreover, Component A is more preferably having at least a block consisting of monomer units represented by the following Formula (A-1), and particularly preferably a block copolymer including only the blocks which consisting of monomer units represented by two or more types of the following Formula (A-1).

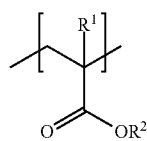

(A-1)

(In the formula, $R^1$ represents a hydrogen atom or a methyl group, and $R^2$ represents an alkyl group, a hydroxyalkyl group, an alkoxyalkyl group, a polyalkyleneoxyalkyl group, an aralkyl group, an allyl group or a dialkylaminoalkyl group.)

$R^1$ in Formula (A-1), from the viewpoint of uniformity at the time of the synthesis and the like, is preferably only either a hydrogen atom or a methyl group in one type of block in Component A.

$R^2$ in Formula (A-1), from the viewpoint of compatibility with the plasticizer and crosslinking agent which coexist in a film, preferably has 1 to 16 carbon atoms, more preferably 1 to 12 carbon atoms, and particularly preferably 1 to 8 carbon atoms.

Moreover, $R^2$ in the formula (A-1), from the viewpoint of compatibility with the plasticizer and crosslinking agent which coexist in a film, is preferably an alkyl group or a hydroxyalkyl group, particularly preferably an alkyl group. In addition, an alkyl group, a hydroxyalkyl group, an alkoxyalkyl group, a polyalkyleneoxyalkyl group, an aralkyl group, and a dialkylaminoalkyl group in the above $R^2$ may have a straight chain, branched, or ring structure.

As a monomer which forms the monomer unit represented by above Formula (A-1), compounds represented by the following Formula (A'-1) are included.

$R^1$ and $R^2$ in following Formula (A'-1) have the same definitions as $R^1$ and $R^2$ in the above formula (A-1), respectively, and preferable aspects are also the same.

(A'-1)

(In the formula, $R^1$ represents a hydrogen atom or a methyl group, and $R^2$ represents an alkyl group, a hydroxyalkyl group, an alkoxyalkyl group, a polyalkyleneoxyalkyl group, an aralkyl group, an allyl group or a dialkylaminoalkyl group.)

Component A, from the viewpoints such as the ease of performing block copolymerization and ease of controlling of the ink transfer properties of an obtained block copolymer or film flexibility, it is preferably a block copolymer obtained by copolymerization of at least two types selected from the following monomer group.

Examples include 2-hydroxyethyl (meth)acrylate, 2-hydroxypropyl (meth)acrylate, 4-hydroxybutyl (meth)acrylate, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-hexyl (meth)acrylate, 2-ethylhexyl (meth)acrylate, acetoxyethyl (meth)acrylate, phenyl (meth)acrylate, 2-methoxyethyl (meth)acrylate, 2-ethoxyethyl (meth)acrylate, 2-(2-methoxyethoxy)ethyl (meth)acrylate, cyclohexyl (meth)acrylate, benzyl (meth)acrylate, diethylene glycol monomethyl ether (meth)acrylate, diethylene glycol monoethyl ether (meth)acrylate, diethylene glycol monophenyl ether (meth)acrylate, triethylene glycol monomethyl ether (meth)acrylate, triethylene glycol monoethyl ether (meth)acrylate, dipropylene glycol monomethyl ether (meth)acrylate, polyethylene glycol monomethyl ether (meth)acrylate, polypropylene glycol monomethyl ether (meth)acrylate, monomethyl ether (meth) acrylate of the copolymer of ethylene glycol and propylene glycol, N,N-dimethylaminoethyl (meth)acrylate, N,N-diethylaminoethyl (meth)acrylate, N,N-dimethylaminopropyl (meth)acrylate, and the like. Furthermore, the modified acrylic resin which comprises the acrylic monomer having a urethane group or a urea group can also be used preferably.

Among these, as a monomer to synthesize Component A, from the viewpoint of printing durability, 2-hydroxyethyl (meth)acrylate, 2-hydroxypropyl (meth)acrylate, 4-hydroxybutyl (meth)acrylate, methyl (meth)acrylate, ethyl (meth)acrylate, n-propyl (meth)acrylate, isopropyl (meth)acrylate, and n-butyl (meth)acrylate are preferable, and 2-hydroxyethyl (meth)acrylate, methyl (meth)acrylate, and n-butyl (meth)acrylate are more preferable.

Moreover, Component A is preferably the block copolymer obtained by carrying out copolymerization of at least methyl (meth)acrylate, more preferably the block copolymer obtained by carrying out copolymerization of 2-hydroxyethyl (meth)acrylate, 2-hydroxypropyl (meth)acrylate, 4-hydroxybutyl (meth)acrylate, ethyl (meth)acrylate, n-propyl (meth) acrylate, isopropyl (meth)acrylate and/or n-butyl (meth)acrylate, by using methyl (meth)acrylate as an essential component, yet more preferably the block copolymer obtained by copolymerization of n-butyl (meth)acrylate, by using methyl (meth)acrylate as an essential component.

Furthermore, among these, Component A is preferably poly(methyl methacrylate)-poly(n-butyl acrylate)-poly(methyl methacrylate)triblock copolymer, poly(methyl methacrylate)-poly(n-butyl methacrylate)-poly(methyl methacrylate)triblock copolymer, and poly(methyl methacrylate)-poly(n-butyl acrylate)diblock copolymer, and particularly preferably poly(methyl methacrylate)-poly(n-butyl acrylate)-poly(methyl methacrylate)triblock copolymer.

Moreover, the ratio of monomer units derived from methyl methacrylate in a single block of Component A with respect to the total weight of the block is preferably 80 wt % or more, more preferably 90 wt % or more, and particularly preferably 95 to 100 wt %. In addition, the ratio of monomer units derived from the n-butyl acrylate in a single block of Component A with respect to the total weight of the block is preferably 80 wt % or more, more preferably 90 wt % or more, and particularly preferably 95 to 100 wt %.

The weight-average molecular weight (Mw) of Component A is preferably 30,000 to 300,000, more preferably 50,000 to 200,000, yet more preferably 60,000 to 180,000, particularly preferably 70,000 to 170,000. When in the above range, the viscosity of a resin composition is moderate, manufacture of the flexographic printing plates is easy, and tensile strength, elongation, and elasticity or flexibility of an obtained relief layer are excellent.

The content of Component A in the resin composition for laser engraving of the present invention with respect to the total amount of solid component of resin composition is preferably 10 to 80 wt %, more preferably 15 to 70 wt %, particularly preferably 20 to 60 wt %. When in the above-mentioned range, printing durability is more excellent, it is more excellent printing durability.

(Component B) Crosslinking Agent

The resin composition for laser engraving of the present invention preferably comprises (Component B) a crosslinking agent.

(Component B) The crosslinking agent in the present invention is not particularly limited as long as it reacts with each other, or reacts with other components in the resin composition so as to form a crosslinking structure.

Moreover, (Component B) the crosslinking agent is preferably used with (Component C) a crosslinking catalyst described later.

(Component B) The crosslinking agent which can be used for the present invention preferably includes (Component B-1) a compound having a hydrolyzable silyl group and/or a silanol group, (Component B-2) a polyfunctional ethylenically unsaturated compound or (Component B-3) a compound having two or more ring structures selected from the group consisting of an epoxy ring, an oxetane ring, and a five-membered carbonate ring.

(Component B-1) Compound Having Hydrolyzable Silyl Group and/or Silanol Group

The resin composition for lazer engraving of the present invention preferably comprises (Component B-1) a compound having a hydrolyzable silyl group and/or a silanol group as Component B.

The 'hydrolyzable silyl group' of Component B-1 used in the resin composition for laser engraving of the present invention is a silyl group that has a hydrolyzable group; examples of the hydrolyzable group include an alkoxy group, an aryloxy group, a mercapto group, a halogen atom, an amide group, an acetoxy group, an amino group, and an isopropenoxy group. A silyl group is hydrolyzed to become a silanol group, and a silanol group undergoes dehydration-condensation to form a siloxane bond. Such a hydrolyzable silyl group or silanol group is preferably one represented by Formula (1) below.

In Formula (1) above, $R^1$ to $R^3$ independently denote a hydrolyzable group selected from the group consisting of an alkoxy group, an aryloxy group, a mercapto group, a halogen atom, an amide group, an acetoxy group, an amino group, and an isopropenoxy group, a hydroxy group, a hydrogen atom, or a monovalent organic group. In addition, at least one of $R^1$ to $R^3$ denotes a hydrolyzable group selected from the group consisting of an alkoxy group, an aryloxy group, a mercapto group, a halogen atom, an amide group, an acetoxy group, an amino group, and an isopropenoxy group, or a hydroxy group. A wavy line portion represents a binding site with other structures.

A preferred organic group in a case where $R^1$ to $R^3$ represents a monovalent organic group includes an alkyl group having 1 to 30 carbon atoms from the viewpoint of imparting solubility to various organic solvents.

In Formula (1) above, the hydrolyzable group bonded to the silicon atom is particularly preferably an alkoxy group or a halogen atom.

From the viewpoint of rinsing properties and printing durability, the alkoxy group is preferably an alkoxy group having 1 to 30 carbon atoms, more preferably an alkoxy group having 1 to 15 carbon atoms, yet more preferably an alkoxy group having 1 to 5 carbon atoms, particularly preferably an alkoxy group having 1 to 3 carbon atoms.

Furthermore, examples of the halogen atom include an F atom, a Cl atom, a Br atom, and an I atom, and from the viewpoint of ease of synthesis and stability it is preferably a Cl atom or a Br atom, and more preferably a Cl atom.

Component B-1 is preferably a compound having one or more groups represented by Formula (1) above, and more preferably a compound having two or more. Component B-1 having two or more hydrolyzable silyl groups is particularly preferably used.

Component B-1 having in the molecule two or more silicon atoms having a hydrolyzable group bonded thereto is preferably used. The number of silicon atoms having a hydrolyzable group bond thereto contained in Component B-1 is preferably at least 2 but no greater than 6, and most preferably 2 or 3.

A range of 1 to 4 of the hydrolyzable groups may bond to one silicon atom, and the total number of hydrolyzable groups in Formula (1) is preferably in a range of 2 or 3. It is particularly preferable that three hydrolyzable groups are bonded to a silicon atom. When two or more hydrolyzable groups are bonded to a silicon atom, they may be identical to or different from each other.

Specific preferred examples of the alkoxy group include a methoxy group, an ethoxy group, a propoxy group, an isopropoxy group, a butoxy group, a tert-butoxy group, and a benzyloxy group. Examples of the alkoxysilyl group having an alkoxy group bonded thereto include a trialkoxysilyl group such as a trimethoxysilyl group, a triethoxysilyl group, a triisopropoxysilyl group; a dialkoxymonoalkylsilyl group such as a dimethoxymethylsilyl group or a diethoxymethylsilyl group; and a monoalkoxydialkylsilyl group such as a methoxydimethylsilyl group or an ethoxydimethylsilyl group. A plurality of each of these alkoxy groups may be used in combination, or a plurality of different alkoxy groups may be used in combination.

Specific examples of the aryloxy group include a phenoxy group. Examples of the aryloxysilyl group having an aryloxy group bonded thereto include a triaryloxysilyl group such as a triphenoxysilyl group.

Preferred examples of Component B-1 in the present invention include compounds in which a plurality of groups represented by Formula (1) above are bonded via a linking group, and from the viewpoint of the effects, such a linking group is preferably a linking group having a sulfide group, an imino group or a ureylene group.

The representative synthetic method of Component B-1 containing a linking group having a sulfide group, an imino group or ureylene group is shown below.

<Synthetic Method for Compound Having Hydrolyzable Silyl Group and/or Silanol Group and Having Sulfide Group as Linking Group>

A synthetic method for a Component B-1 having a sulfide group as a linking group (hereinafter, called as appropriate a 'sulfide linking group-containing Component B-1') is not particularly limited, but specific examples thereof include reaction of a Component B-1 having a halogenated hydrocarbon group with an alkali metal sulfide, reaction of a Component B-1 having a mercapto group with a halogenated hydrocarbon, reaction of a Component B-1 having a mercapto group with a Component B-1 having a halogenated hydrocarbon group, reaction of a Component B-1 having a halogenated hydrocarbon group with a mercaptan, reaction of a Component B-1 having an ethylenically unsaturated double bond with a mercaptan, reaction of a Component B-1 having an ethylenically unsaturated double bond with a Component B-1 having a mercapto group, reaction of a compound having an ethylenically unsaturated double bond with a Component B-1 having a mercapto group, reaction of a ketone with a Component B-1 having a mercapto group, reaction of a diazonium salt with a Component B-1 having a mercapto group, reaction of a Component B-1 having a mercapto group with an oxirane, reaction of a Component B-1 having a mercapto group with a Component B-1 having an oxirane group, reaction of a mercaptan with a Component B-1 having an oxirane group, and reaction of a Component B-1 having a mercapto group with an aziridine.

<Synthetic Method for Compound Having Hydrolyzable Silyl Group and/or Silanol Group and Having Imino Group as Linking Group>

A synthetic method for a Component B-1 having an imino group as a linking group (hereinafter, called as appropriate an 'imino linking group-containing Component B-1') is not particularly limited, but specific examples include reaction of a Component B-1 having an amino group with a halogenated hydrocarbon, reaction of a Component B-1 having an amino group with a Component B-1 having a halogenated hydrocarbon group, reaction of a Component B-1 having a halogenated hydrocarbon group with an amine, reaction of a Component B-1 having an amino group with an oxirane, reaction of a Component B-1 having an amino group with a Component B-1 having an oxirane group, reaction of an amine with a Component B-1 having an oxirane group, reaction of a Component B-1 having an amino group with an aziridine, reaction of a Component B-1 having an ethylenically unsaturated double bond with an amine, reaction of a Component B-1 having an ethylenically unsaturated double bond with a Component B-1 having an amino group, reaction of a compound having an ethylenically unsaturated double bond with a Component B-1 having an amino group, reaction of a compound having an acetylenically unsaturated triple bond with a Component B-1 having an amino group, reaction of a Component B-1 having an imine-based unsaturated double bond with an organic alkali metal compound, reaction of a Component B-1 having an imine-based unsaturated double bond with an organic alkaline earth metal compound, and reaction of a carbonyl compound with a Component B-1 having an amino group.

<Synthetic Method for Compound Having Hydrolyzable Silyl Group and/or Silanol Group and Having Urea Bond (Ureylene Group) as Linking Group>

A synthetic method for a Component B-1 having an ureylene group (hereinafter, called as appropriate a 'ureylene linking group-containing Component B-1') as a linking group is not particularly limited, but specific examples include synthetic methods such as reaction of a Component B-1 having an amino group with an isocyanate ester, reaction of a Component B-1 having an amino group with a Component B-1 having an isocyanate ester, and reaction of an amine with a Component B-1 having an isocyanate ester.

A silane coupling agent is preferably used as Component B-1 in the preset invention.

Hereinafter, the silane coupling agent suitable as Component B-1 in the present invention will be described.

In the present invention, the functional group in which an alkoxy group or a halogeno group (halogen atom) is directly bonded to at least one Si atom is called a silane coupling group, and the compound which has one or more silane coupling groups in the molecule is also called a silane coupling agent. The silane coupling group is preferable in which an alkoxy group or halogen atoms is directly bonded to two or more Si atoms, particularly preferably directly bonded to at least three or more.

In the silane coupling agent which is a preferable aspect in the present invention, as a functional group directly bonded to the Si atom, it is indispensable to have at least one or more functional groups selected from an alkoxy group and a halogen atom, and one having an alkoxy group is preferable from the viewpoint of ease of handling of the compound.

Here, with regard to the alkoxy group from the viewpoint of rinsing properties and printing durability, an alkoxy group having 1 to 30 carbon atoms is preferable, an alkoxy group having 1 to 15 carbon atoms is more preferable, and an alkoxy group having 1 to 5 carbon atoms is yet more preferable.

Moreover, as a halogen atom, an F atom, a Cl atom, a Br atom, and an I atom are included; from the viewpoint of ease of synthesis and stability, a Cl atom and a Br atom are preferable, and a Cl atom is more preferable.

The silane coupling agent in the present invention preferably contains at least 1 but no greater than 10 of above silane coupling groups within the molecule from the viewpoint of favorably maintaining a balance of the degree of crosslinking of the film and flexibility, more preferably contains at least 1 but no greater than 5, and particularly preferably contains at least 2 but no greater than 4.

When there are two or more of silane coupling groups, it is preferable that silane coupling groups are connected with the linking group each other. As the linking group includes at least a divalent organic group which may have substituents such as a hetero atom and hydrocarbons, from the viewpoint of high engraving sensitivity, an aspect containing hetero atoms (N, S, O) is preferable, and a linking group containing an S atom is particularly preferable.

From these viewpoints, as the silane coupling agent in the present invention, a compound that having in the molecule two silane coupling groups in which the methoxy group or ethoxy group, particularly a methoxy group is bonded to a Si atom as an alkoxy group and these silane coupling groups are bonded through an alkylene group containing a hetero atom (particularly preferably a S atom) is preferable. More specifically, one having a linking group containing a sulfide group is preferable.

Moreover, as another preferred aspect of the linking group connecting together silane coupling groups, a linking group having an oxyalkylene group is included. Since the linking group contains an oxyalkylene group, rinsing properties of engraving residue after laser engraving are improved. As the oxyalkylene group, an oxyethylene group is preferable, and a polyoxyethylene chain in which a plurality of oxyethylene groups are connected is more preferable. The total number of oxyethylene groups in the polyoxyethylene chain is preferably 2 to 50, more preferably 3 to 30, particularly preferably 4 to 15.

Specific examples of the silane coupling agent that can be used in the present invention are shown below. Examples thereof include β-(3,4-epoxycyclohexyl)ethyltrimethoxysilane, γ-glycidoxypropyltrimethoxysilane, γ-glycidoxypropylmethyldiethoxysilane, γ-glycidoxypropyltriethoxysilane, N-(β-aminoethyl)-γ-aminopropylmethyldimethoxysilane, N-(β-aminoethyl)-γ-aminopropyltrimethoxysilane, N-(β-aminoethyl)-γ-aminopropyltriethoxysilane, γ-aminopropyltrimethoxysilane, γ-aminopropyltriethoxysilane, N-phenyl-γ-aminopropyltrimethoxysilane, γ-mercaptopropyltrimethoxysilane, γ-mercaptopropyltriethoxysilane, bis(triethoxysilylpropyl)disulfide, bis(triethoxysilylpropyl)tetrasulfide, 1,4-bis(triethoxysilyl)benzene, bis(triethoxysilyl)ethane, 1,6-bis(trimethoxysilyl)hexane, 1,8-bis(triethoxysilyl)octane, 1,2-bis(trimethoxysilyl)decane, bis(triethoxysilylpropyl)amine, bis(trimethoxysilylpropyl)urea, γ-chloropropyltrimethoxysilane, γ-ureidopropyltriethoxysilane. Other than the above, the compounds shown below can be cited as preferred examples, but the present invention should not be construed as being limited thereto.

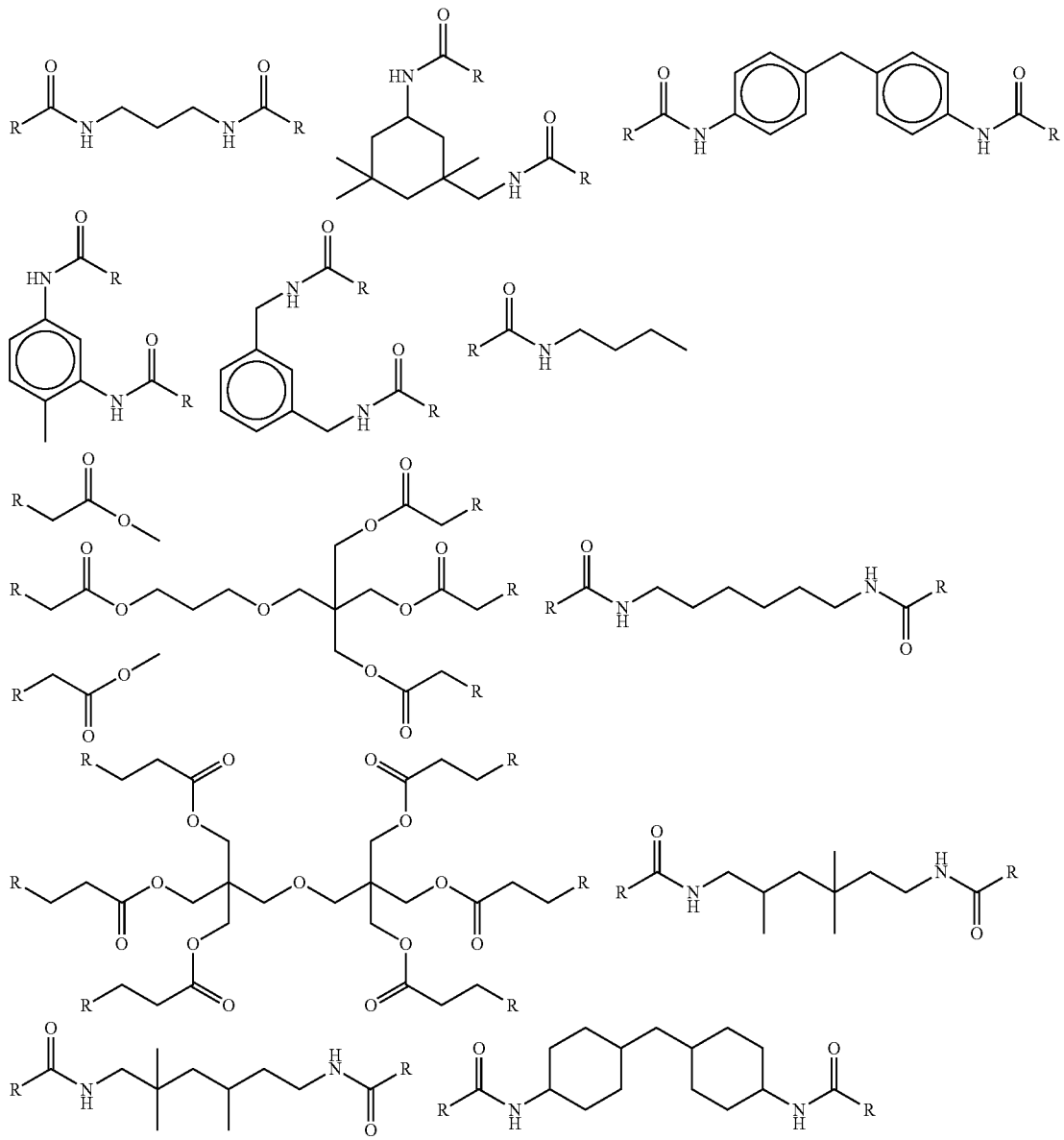

-continued
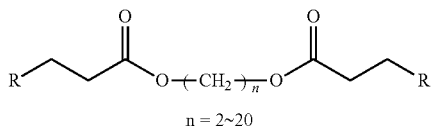
n = 2~20
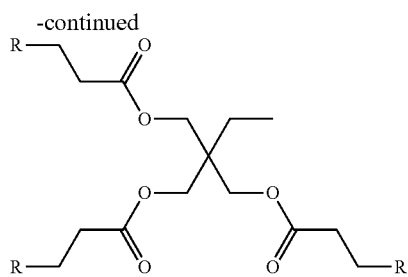
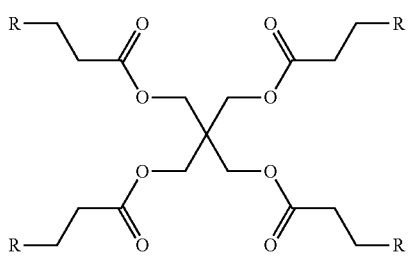
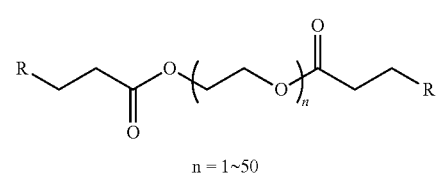
n = 1~50
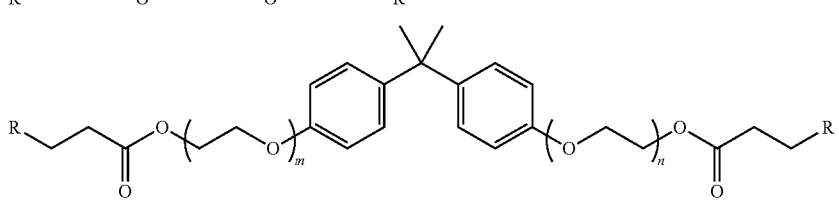
m + n = 2~50
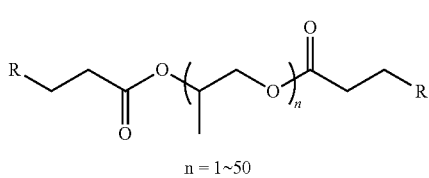
n = 1~50
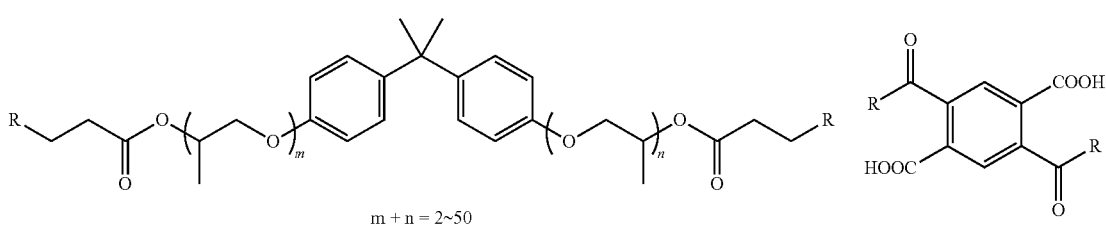
m + n = 2~50
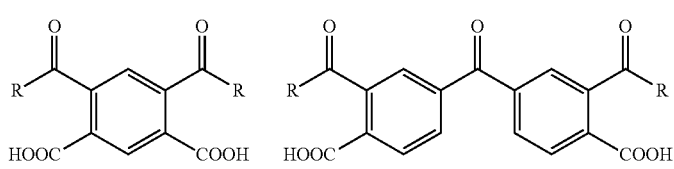
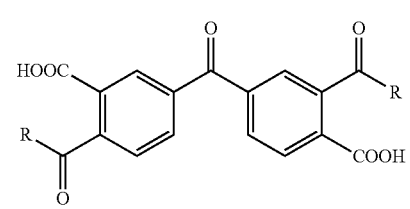
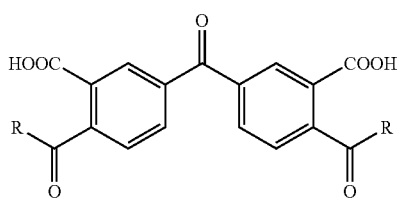
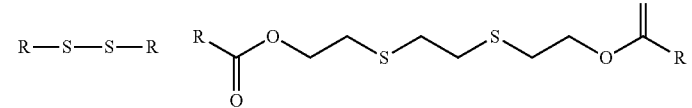
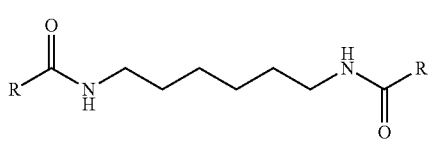

In each of the formulae above, R denotes a partial structure selected from the structures below. When a plurality of Rs and $R^1$s are present in the molecule, they may be identical to or different from each other, and are preferably identical to each other in terms of synthetic suitability. Et in the chemical formulae below is an ethyl group, and Me is a methyl group.

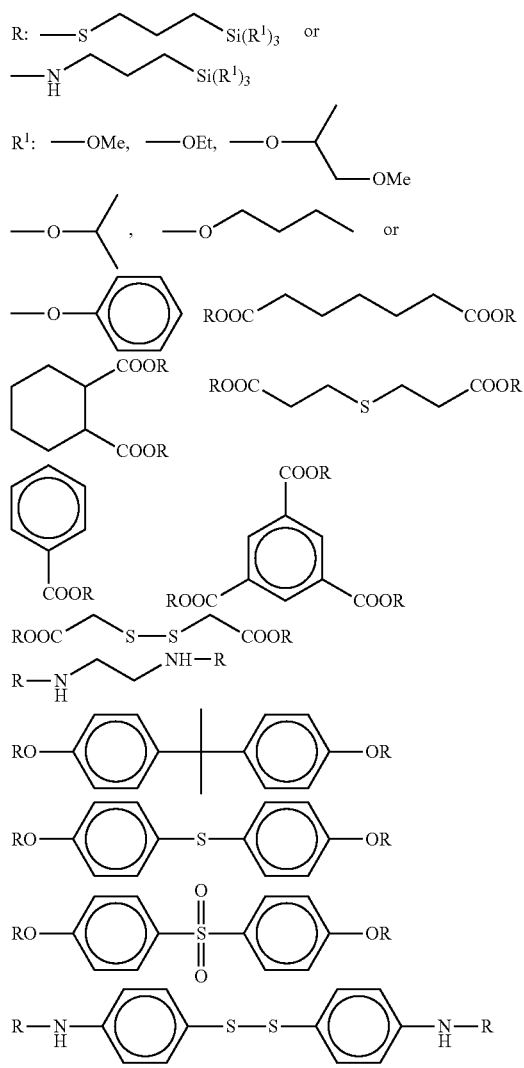

In each of the formulae above, R denotes a partial structure selected from the structures below. $R^1$ is the same as defined above. When a plurality of Rs and $R^1$s are present in the molecule, they may be identical to or different from each other, and are preferably identical to each other in terms of synthetic suitability.

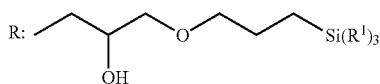

Component B-1 may be obtained by synthesis as appropriate, but use of a commercially available product is preferable in terms of cost. Since Component B-1 corresponds to for example commercially available silane products or silane coupling agents from Shin-Etsu Chemical Co., Ltd., Dow Corning Toray, Momentive Performance Materials Inc., Chisso Corporation, etc., the resin composition of the present invention may employ such a commercially available product by appropriate selection according to the intended application.

As the silane coupling agent in the present invention, a partial hydrolysis-condensation product obtained using one type of compound having a hydrolyzable silyl group and/or a silanol group or a partial cohydrolysis-condensation product obtained using two or more types may be used. Hereinafter, these compounds may be called 'partial (co)hydrolysis-condensation products'.

Specific examples of such a partial (co)hydrolysis-condensation product include a partial (co)hydrolysis condensate obtained by using, as a precursor, one or more selected from the group of silane compounds consisting of alkoxysilanes or acetyloxysilanes such as tetramethoxysilane, tetraethoxysilane, methyltrimethoxysilane, methyltriethoxysilane, methyltriisopropoxysilane, methyltriacetoxysilane, methyltris(methoxyethoxy)silane, methyltris(methoxypropoxy)silane, ethyltrimethoxysilane, propyltrimethoxysilane, butyl trimethoxysilane, hexyltrimethoxysilane, octyltrimethoxysilane, decyltrimethoxysilane, cyclohexyltrimethoxysilane, phenyltrimethoxysilane, phenyltriethoxysilane, tolyltrimethoxysilane, chloromethyltrimethoxysilane, γ-chloropropyltrimethoxysilane, 3,3,3-trifluoropropyltrimethoxysilane, cyanoethyltriethoxysilane, γ-glycidoxypropyltrimethoxysilane, γ-glycidoxypropyltriethoxysilane, β-(3,4-epoxycyclohexyl)ethyltrimethoxysilane, γ-aminopropyltrimethoxysilane, γ-aminopropyltriethoxysilane, N-β(aminoethyl)-γ-aminopropyltrimethoxysilane, N-phenyl-γ-aminopropyltrimethoxysilane, γ-mercaptopropyltrimethoxysilane, dimethyldimethoxysilane, dimethyldiethoxysilane, diethyldimethoxysilane, methylethyldimethoxysilane, methylpropyldimethoxysilane, diphenyldimethoxysilane, diphenyldiethoxysilane, methylphenyldimethoxysilane, γ-chloropropylmethyldimethoxysilane, 3,3,3-trifluoropropylmethyldimethoxysilane, γ-glycidoxypropylmethyldiethoxysilane, γ-aminopropylmethyldiethoxysilane, N-β-(aminoethyl)-γ-aminopropylmethyldimethoxysilane and γ-mercaptopropylmethyldiethoxysilane, and an acyloxysilane such as ethoxalyloxysilane.

Among silane compounds as partial (co)hydrolysis-condensation product precursors, from the viewpoint of versatility, cost, and film compatibility, a silane compound having a substituent selected from a methyl group and a phenyl group as a substituent on the silicon is preferable. Specific preferred examples of the precursor include methyltrimethoxysilane, methyltriethoxysilane, phenyltrimethoxysilane, phenyltriethoxysilane, dimethyldimethoxysilane, dimethyldiethoxysilane, diphenyldimethoxysilane, and diphenyldiethoxysilane.

In this case, as a partial (co)hydrolysis-condensation product, it is preferable to use a dimer (2 moles of silane compound is reacted with 1 mole of water to eliminate 2 moles of alcohol, thus giving a disiloxane unit) of the silane compounds cited above to 100-mer of the above-mentioned silane compound, more preferably a dimer to 50-mer, and yet more preferably a dimer to 30-mer, and it is also possible to use a partial (co)hydrolysis-condensation product formed using two or more types of silane compounds as starting materials.

As such a partial (co)hydrolysis-condensation product, ones commercially available as silicone alkoxy oligomers may be used (e.g. those from Shin-Etsu Chemical Co., Ltd.) or ones that are produced in accordance with a standard method by reacting a hydrolyzable silane compound with less than an equivalent of hydrolytic water and then removing by-products such as alcohol and hydrochloric acid may be used. When the production employs, for example, an acyloxysilane or an alkoxysilane described above as a hydrolyzable silane compound starting material, which is a precursor, partial hydrolysis-condensation may be carried out using as a reaction catalyst an acid such as hydrochloric acid or sulfuric acid, an alkali metal or alkaline earth metal hydroxide such as sodium hydroxide or potassium hydroxide, or an alkaline organic material such as triethylamine, and when the production is carried out directly from a chlorosilane, water and alcohol may be reacted using hydrochloric acid by-product as a catalyst.

(Component B-2) Polyfunctional Ethylenically Unsaturated Compound

The resin composition of laser engraving of the present invention preferably comprises (Component B-2) a polyfunctional ethylenically unsaturated compound as Component B.

As the polyfunctional ethylenically unsaturated compound, compounds having 2 to 20 terminal ethylenically unsaturated groups are preferable. These compound groups are widely known in the present industrial field, and, in the present invention, these may be used without particular limitation. These have chemical forms such as a monomer, a prepolymer, that is, a dimer, a trimer and an oligomer, or copolymers of monomers, and mixtures thereof.

Examples of compounds from which the ethylenically unsaturated group in the polyfunctional ethylenically unsaturated compound is derived include unsaturated carboxylic acids (such as acrylic acid, methacrylic acid, itaconic acid, crotonic acid, isocrotonic acid and maleic acid), and esters and amides thereof. Preferably esters of an unsaturated carboxylic acid and an aliphatic polyhydric alcoholic compound, or amides of an unsaturated carboxylic acid and an aliphatic polyvalent amine compound are used. Moreover, addition reaction products of unsaturated carboxylic acid esters or amides having a nucleophilic substituent such as a hydroxyl group or an amino group with polyfunctional isocyanates or epoxies, and dehydrating condensation reaction products with a polyfunctional carboxylic acid, etc. are also used favorably. Moreover, addition reaction products of unsaturated carboxylic acid esters or amides having an electrophilic substituent such as an isocyanato group or an epoxy group with monofunctional or polyfunctional alcohols or amines, and substitution reaction products of unsaturated carboxylic acid esters or amides having a leaving group such as a halogen group or a tosyloxy group with monofunctional or polyfunctional alcohols or amines are also favorable. Moreover, as another example, the use of compounds obtained by replacing the unsaturated carboxylic acid with a vinyl compound, an allyl compound, an unsaturated phosphonic acid, styrene or the like is also possible.

From the viewpoint of the reactivity, the ethylenically unsaturated group contained in the polyfunctional ethylenically unsaturated compound is preferably a residue of each of acrylates, methacrylates, vinyl compounds and allyl compounds. From the viewpoint of the printing durability, the polyfunctional ethylenically unsaturated compound more preferably comprises three or more ethylenically unsaturated groups.

Specific examples of ester monomers comprising an ester of an aliphatic polyhydric alcohol compound and an unsaturated carboxylic acid include acrylic acid esters such as ethylene glycol diacrylate, triethylene glycol diacrylate, 1,3-butanediol diacrylate, tetramethylene glycol diacrylate, propylene glycol diacrylate, neopentyl glycol diacrylate, trimethylolpropane triacrylate, trimethylolpropane tri(acryloyloxypropyl)ether, trimethylolethane triacrylate, hexanediol diacrylate, 1,4-cyclohexanediol diacrylate, tetraethylene glycol diacrylate, pentaerythritol diacrylate, pentaerythritol triacrylate, pentaerythritol tetraacrylate, dipentaerythritol diacrylate, dipentaerythritol hexaacrylate, sorbitol triacrylate, sorbitol tetraacrylate, sorbitol pentaacrylate, sorbitol hexaacrylate, tri(acryloyloxyethyl)isocyanurate, and a polyester acrylate oligomer.

Examples of methacrylic acid esters include tetramethylene glycol dimethacrylate, triethylene glycol dimethacrylate, neopentyl glycol dimethacrylate, trimethylolpropane trimethacrylate, trimethylolethane trimethacrylate, ethylene glycol dimethacrylate, 1,3-butanediol dimethacrylate, hexanediol dimethacrylate, pentaerythritol dimethacrylate, pentaerythritol trimethacrylate, pentaerythritol tetramethacrylate, dipentaerythritol dimethacrylate, dipentaerythritol hexamethacrylate, sorbitol trimethacrylate, sorbitol tetramethacrylate, bis[p-(3-methacryloxy-2-hydroxypropoxy)phenyl]dimethylmethane, and bis[p-(methacryloxyethoxy)phenyl]dimethylmethane.

Examples of itaconic acid esters include ethylene glycol diitaconate, propylene glycol diitaconate, 1,3-butanediol diitaconate, 1,4-butanediol diitaconate, tetramethylene glycol diitaconate, pentaerythritol diitaconate, and sorbitol tetraitaconate.

Examples of crotonic acid esters include ethylene glycol dicrotonate, tetramethylene glycol dicrotonate, pentaerythritol dicrotonate, and sorbitol tetradicrotonate.

Examples of isocrotonic acid esters include ethylene glycol diisocrotonate, pentaerythritol diisocrotonate, and sorbitol tetraisocrotonate.

Examples of maleic acid esters include ethylene glycol dimaleate, triethylene glycol dimaleate, pentaerythritol dimaleate, and sorbitol tetramaleate.

As examples of other esters, aliphatic alcohol-based esters described in JP-B-46-27926 (JP-B denotes a Japanese examined patent application publication), JP-B-51-47334 and JP-A-57-196231, those having an aromatic skeleton described in JP-A-59-5240, JP-A-59-5241, and JP-A-2-226149, those having an amino group described in JP-A-1-165613, etc. may also be used suitably.

The above-mentioned ester monomers may be used as a mixture.

Furthermore, specific examples of amide monomers including an amide of an aliphatic polyamine compound and an unsaturated carboxylic acid include N,N'-methylenebisacrylamide, N,N'-methylenebismethacrylamide, 1,6-hexamethylenebisacrylamide, 1,6-hexamethylenebismethacrylamide, diethylenetriaminetrisacrylamide, xylylenebisacrylamide, and xylylenebismethacrylamide.

Preferred examples of other amide-based monomers include those having a cyclohexylene structure described in JP-B-54-21726.

Furthermore, a urethane-based addition-polymerizable compound produced by an addition reaction of an isocyanate and a hydroxy group is also suitable, and specific examples thereof include a vinylurethane compound comprising two or more polymerizable vinyl groups per molecule in which a hydroxy group-containing vinyl monomer represented by Formula (i) below is added to a polyisocyanate compound having two or more isocyanate groups per molecule described in JP-B-48-41708.

CH$_2$=C(R)COOCH$_2$CH(R')OH (i)

wherein R and R' independently denote H or CH$_3$.

Furthermore, urethane acrylates described in JP-A-51-37193, JP-B-2-32293, and JP-B-2-16765, and urethane compounds having an ethylene oxide-based skeleton described in JP-B-58-49860, JP-B-56-17654, JP-B-62-39417, JP-B-62-39418 are also suitable.

Furthermore, by use of an addition-polymerizable compound having an amino structure or a sulfide structure in the molecule described in JP-A-63-277653, JP-A-63-260909, and JP-A-1-105238, a photosensitive resin composition having very good photosensitive speed can be obtained.

Other examples include polyester acrylates such as those described in JP-A-48-64183, JP-B-49-43191, and JP-B-52-30490, and polyfunctional acrylates and methacrylates such as epoxy acrylates formed by a reaction of an epoxy resin and (meth)acrylic acid. Examples also include specific unsaturated compounds described in JP-B-46-43946, JP-B-1-40337, and JP-B-1-40336, and vinylphosphonic acid-based compounds described in JP-A-2-25493. In some cases, perfluoroalkyl group-containing structures described in JP-A-61-22048 are suitably used. Moreover, those described as photocuring monomers or oligomers in the Journal of the Adhesion Society of Japan, Vol. 20, No. 7, pp. 300 to 308 (1984) may also be used.

Examples of the vinyl compounds include butanediol-1,4-divinyl ether, ethylene glycol divinyl ether, 1,2-propanediol divinyl ether, 1,3-propanediol divinyl ether, 1,3-butanediol divinyl ether, 1,4-butanediol divinyl ether, neopentyl glycol divinyl ether, trimethylolpropane tirvinyl ether, trimethylolethane tirvinyl ether, hexanediol divinyl ether, tetraethylene glycol divinyl ether, pentaerythritol divinyl ether, pentaerythritol tirvinyl ether, pentaerythritol tetravinyl ether, sorbitol tetravinyl ether, sorbitol pentavinyl ether, ethylene glycol diethylenevinyl ether, ethylene glycol dipropylenevinyl ether, trimethylolpropane triethylenevinyl ether, trimethylolpropane diethylenevinyl ether, pentaerythritol diethylenevinyl ether, pentaerythritol triethylenevinyl ether, pentaerythritol tetraethylenevinyl ether, 1,1,1-tris[4-(2-vinyloxyethoxy) phenyl]ethane, bisphenol A divinyloxyethyl ether, divinyl adipate, etc.

Examples of the allyl compounds include polyethylene glycol diallyl ether, 1,4-cyclohexane diallyl ether, 1,4-diethylcyclohexyl diallyl ether, 1,8-octane diallyl ether, trimethylolpropane diallyl ether, trimethylolethane triallyl ether, pentaerythritol triallyl ether, pentaerythritol tetraallyl ether, dipentaerythritol pentaallyl ether, dipentaerythritol hexaallyl ether, diallyl phthalate, diallyl terephthalate, diallyl isophthalate, triallyl isocyanurate, triallyl phosphate, etc.

In particular, it has excellent phase solubility with Component A, since the crosslinking portion is a skeleton of the same low-temperature resolvability as an acrylic resin, in terms of enhancing the engraving sensitivity, as Component B-2, a (meth) acrylate compound is preferable.

Among these, preferred examples of Component B-2 include diethylene glycol di(meth)acrylate, dipentaerythritol hexa(meth)acrylate, tricyclodecane methanol di(meth)acrylate, trimethylolpropane tri(meth)acrylate, pentaerythritol tetra(meth)acrylate, and 1,6-hexanediol di(meth)acrylate.

(Component B-3) Compound Having Two or More Cyclic Structures Selected from the Group Consisting of an Epoxy Ring, an Oxetane Ring, and a 5-Membered Carbonate Ring.

A resin composition for laser engraving of the present invention preferably contains (Component B-3) a compound having two or more cyclic structures selected from the group consisting of an epoxy ring, an oxetane ring, and a 5-membered carbonate ring.

Component B-3 may be any form of a monomer, an oligomer, and a polymer, and the molecular weight and molecular structure are not particularly limited other than having two or more cyclic structures selected from the group consisting of an epoxy ring, an oxetane ring, and a 5-membered carbonate ring.

Component B-3 is preferably a compound with a molecular weight of less than 1,000.

Moreover, with regard to Component B-3, one type may be used on its own, or two or more types may be used in combination.

Component B-3 is preferably a compound having two or more cyclic structures selected from the group consisting of an epoxy ring and an oxetane ring, more preferably a compound having two or more epoxy rings.

Furthermore, the number of cyclic structures selected from the group consisting of an epoxy ring, an oxetane ring, and a 5-membered carbonate ring in Component B-3 is preferably 2 to 10, more preferably 2 to 6, yet more preferably 2 to 4, and particularly preferably 2 or 3.

Examples of the compounds having two of more epoxy rings include polyfunctional aromatic epoxides, polyfunctional alicyclic epoxides, and polyfunctional aliphatic epoxides.

Examples of the aromatic epoxide include di- or polyglycidyl ethers produced by a reaction between epichlorohydrin and a polyhydric phenol having at least one aromatic nucleus or an alkylene oxide adduct thereof; specific examples include di- or polyglycidyl ethers of bisphenol A or an alkylene oxide adduct thereof, di- or polyglycidyl ethers of hydrogenated bisphenol A or an alkylene oxide adduct thereof, and novolac type epoxy resins. Examples of the alkylene oxide above include ethylene oxide and propylene oxide.

Examples of the alicyclic epoxides include two or more cyclohexene oxide- and two or more cyclopentene oxide-containing compounds obtained by epoxidizing a compound having at least two cycloalkene ring such as a cyclohexene ring or a cyclopentene ring with an appropriate oxidizing agent such as hydrogen peroxide or a peracid.

Examples of the aliphatic epoxides include di- or polyglycidyl ethers of an aliphatic polyhydric alcohol or an alkylene oxide adduct thereof, and representative examples thereof include diglycidyl ethers of an alkylene glycol such as the diglycidyl ether of ethylene glycol, the diglycidyl ether of propylene glycol, and the diglycidyl ether of 1,6-hexanediol, polyglycidyl ethers of a polyhydric alcohol such as the di- or triglycidyl ether of glycerol or an alkylene oxide adduct thereof, and diglycidyl ethers of a polyalkylene glycol such as the diglycidyl ether of polyethylene glycol or an alkylene oxide adduct thereof and the diglycidyl ether of polypropylene glycol or an alkylene oxide adduct thereof. Examples of the alkylene oxide above include ethylene oxide and propylene oxide.

Furthermore, examples of polyfunctional epoxy compounds include bisphenol A diglycidyl ether, bisphenol F diglycidyl ether, bisphenol S diglycidyl ether, brominated bisphenol A diglycidyl ether, brominated bisphenol F diglycidyl ether, brominated bisphenol S diglycidyl ether, epoxy novolac resins, hydrogenated bisphenol A diglycidyl ether, hydrogenated bisphenol F diglycidyl ether, hydrogenated bisphenol S diglycidyl ether, 3,4-epoxycyclohexenylmethyl-3',4'-epoxycyclohexenecarboxylate, 2-(3,4-epoxycyclohexyl-5,5-spiro-3,4-epoxy)cyclohexane-meta-dioxane, bis(3,4-epoxycyclohexylmethyl) adipate, vinylcyclohexene dioxide, 4-vinylepoxycyclohexane, bis(3,4-epoxy-6-methylcyclohexylmethyl) adipate, 3,4-epoxy-6-methylcyclohexenyl 3',4'-epoxy-6'-methylcyclohexenecarboxylate, methylenebis(3,4-epoxycyclohexane), dicyclopentadiene diepoxide, the di(3,4-epoxycyclohexylmethyl)ether of ethylene glycol, ethylene bis(3,4-epoxycyclohexanecarboxylate), dioctyl epoxyhexahydrophthalate, di-2-ethylhexyl epoxyhexahydrophthalate, 1,4-butanediol diglycidyl ether, 1,6-hexanediol diglycidyl ether, glycerol triglycidyl ether, trimethylolpropane triglycidyl ether, polyethylene glycol diglycidyl ether, polypropylene glycol diglycidyl ether, 1,13-tetradecadiene dioxide, limonene dioxide, 1,2,7,8-diepoxyoctane, and 1,2,5,6-diepoxycyclooctane.

Examples of the polymer having two or more epoxy rings that can be used in the present invention include, for examples, crystalline epoxy resins such as a biphenyl type epoxy resin, a bisphenol F type epoxy resin, a bisphenol A type epoxy resin, a stilbene type epoxy resin, and a phenol novolac type epoxy resin; novolac type epoxy resins such as a phenol novolac type epoxy resin, a cresol novolac type epoxy resin, a naphthol novolac type epoxy resin; polyfunctional epoxy resins such as a triphenylmethane type epoxy resin, an alkyl modified triphenylmethane type epoxy resin; aralkyl type epoxy resins such as a phenol aralkyl type epoxy resin having a phenylene skeleton, a phenol aralkyl type epoxy resin having a biphenylene skeleton, a naphthol aralkyl type epoxy resin having a phenylene skeleton, a naphthol aralkyl type epoxy resin having a biphenylene skeleton, a naphthol aralkyl type epoxy resin; naphthol type epoxy resins such as a dihydroxynaphthalene type epoxy resin, an epoxy resin obtained by glycidyl etherification of the dimer of hydroxynaphthalene and/or dihydroxynaphthalene; epoxy resins containing a triazine nucleus such as triglycidyl isocyanurate, a monoallyl diglycidyl isocyanurate; bridge cyclic hydrocarbon compound modified phenol type epoxy resins such as a dicyclopentadiene modified phenol type epoxy resin; and sulfur atom containing type epoxy resins such as a bisphenol S type epoxy resin.

Although the compound having two or more oxetane rings that can be used in the present invention is not particularly limited, the compound can be exemplified below.

The compound having two oxetane rings that can be used in the present invention includes the compound represented by the following Formula (Ox-1) or Formula (Ox-2).

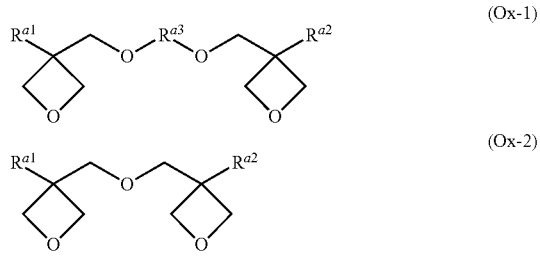

(Ox-1)

(Ox-2)

$R^{a1}$ and $R^{a2}$ independently denote a hydrogen atom, an alkyl group having 1 to 6 carbons, a fluoroalkyl group having 1 to 6 carbons, an allyl group, an aryl group, a furyl group, or a thienyl group.

Examples of the alkyl group include a methyl group, an ethyl group, a propyl group, and a butyl group, and preferred examples of the fluoroalkyl group include those obtained by substituting any of the hydrogen atoms of the above alkyl groups with a fluorine atom.

$R^{a3}$ denotes a linear or branched alkylene group, a linear or branched poly(alkyleneoxy) group, a linear or branched unsaturated hydrocarbon group, a carbonyl group, a carbonyl group-containing alkylene group, a carboxyl group-containing alkylene group, a carbamoyl group-containing alkylene group, or a group shown below. Examples of the alkylene group include an ethylene group, a propylene group, and a butylene group, and examples of the poly(alkyleneoxy) group include a poly(ethyleneoxy) group and a poly(propyleneoxy) group. Examples of the unsaturated hydrocarbon group include a propenylene group, a methylpropenylene group, and a butenylene group.

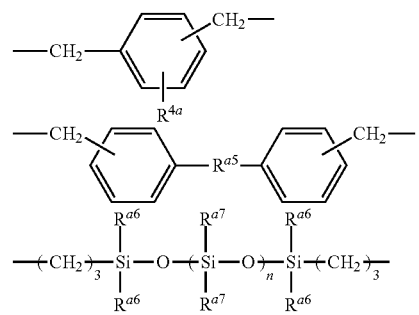

When $R^{a3}$ is the above-mentioned polyvalent group, $R^{a4}$ denotes a hydrogen atom, an alkyl group having 1 to 4 carbons, an alkoxy group having 1 to 4 carbons, a halogen atom, a nitro group, a cyano group, a mercapto group, a lower alkylcarboxyl group, a carboxyl group, or a carbamoyl group.

$R^{a5}$ denotes an oxygen atom, a sulfur atom, a methylene group, NH, SO, $SO_2$, $C(CF_3)_2$, or, $C(CH_3)_2$.

$R^{a6}$ denotes an alkyl group having 1 to 4 carbons or an aryl group, and n is an integer of 0 to 2,000. $R^{a7}$ denotes an alkyl group having 1 to 4 carbons, an aryl group, or a monovalent group having the structure below. In the formula, $R^{a8}$ denotes an alkyl group having 1 to 4 carbons or an aryl group, and m is an integer of 0 to 100.

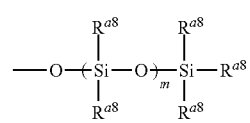

Preferable examples of the compound represented by Formula (Ox-1) include 1,4-bis[(3-ethyl-3-oxetanylmethoxy)methyl]benzene (OXT-121: Toagosei Co., Ltd.). Preferable examples of the compound represented by Formula (Ox-2) include bis(3-ethyl-3-oxetanylmethyl)ether (OXT-221: Toagosei Co., Ltd.).

Examples of the compound having 3 to 4 oxetane rings in the molecule used in the present invention include compounds represented by Formula (Ox-3) below.

(Ox-3)

In Formula (Ox-3), $R^{a1}$ denotes the same as in Formulae (Ox-1) and (Ox-2) above. Furthermore, examples of $R^{a9}$, which is a polyvalent linking group, include a branched alkylene group having 1 to 12 carbons such as a group represented by A to C below, a branched poly(alkyleneoxy) group such as a group represented by D below, and a branched polysiloxane group such as a group represented by E below. j is 3 or 4.

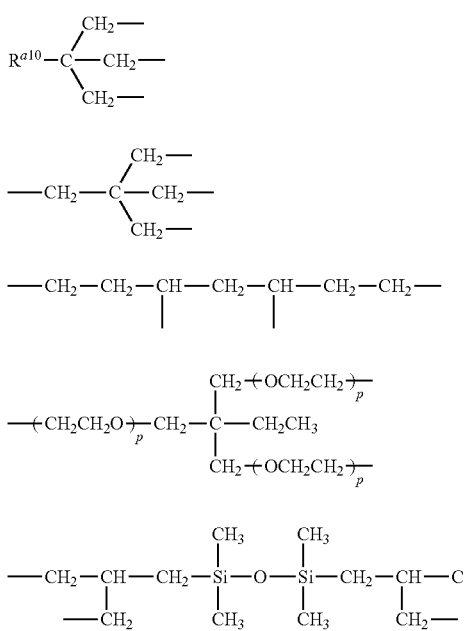

In the above A, $R^{a10}$ denotes a methyl group, an ethyl group, or a propyl group. Furthermore, in the above D, p is an integer of 1 to 10.

A compound having two or more 5-membered carbonate rings that can be used in the present invention can be preferably exemplified by the compound which converts the epoxy ring of the compound having two or more epoxy rings into a 5-membered carbonate ring.

For example, the compound having two or more 5-membered carbonate rings can be synthesized by using reactions such as a reaction of a corresponding diol and phosgene, a reaction of corresponding an oxirane and β-lactone, and a reaction of a corresponding oxirane and carbon dioxide.

Specially, with regard to the compound having two or more 5-membered carbonate rings, the following compounds can be preferably exemplified.

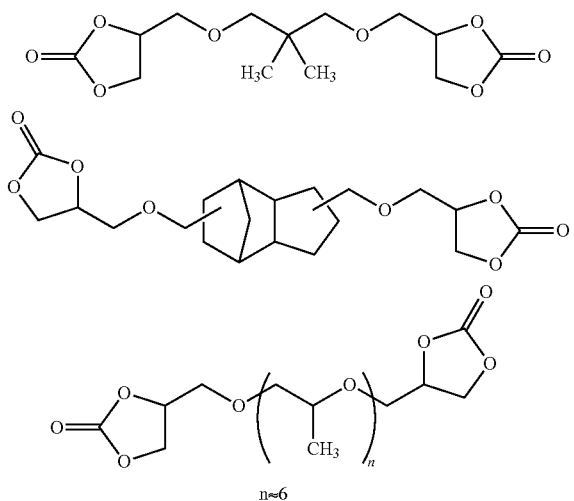

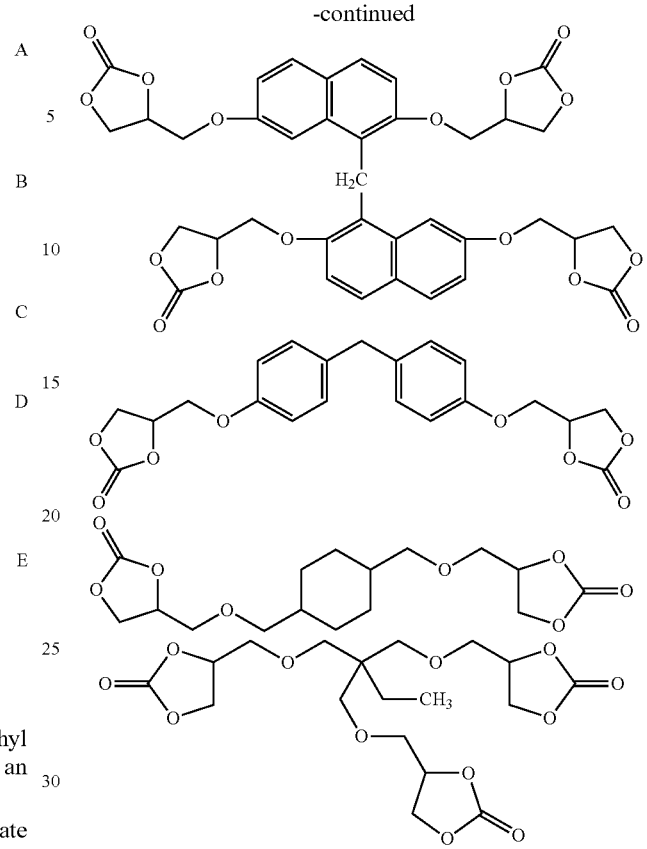

The compounds shown below can be cited as preferred examples of Component B-3, but the present invention should not be construed as being limited thereto.

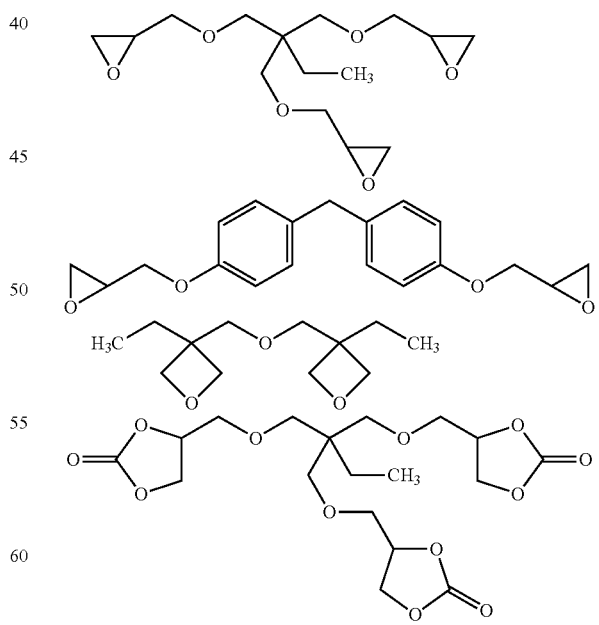

Component B in the resin composition of the present invention may be used only one type or may be used two or more types in combination.

With regard to Component B, out of Components B-1 to B-3, Component B-1 and Component B-2 are preferable, and Component B-1 is more preferable.

The content of Component B in the resin composition for laser engraving of the present invention, with respect to the total solid content of the resin composition, is preferably 0.1 to 80 wt %, more preferably 1 to 40 wt %, particularly preferably 5 to 30 wt %. Moreover, the total solid content of the resin composition represents the quantity of removed volatile components such as solvents.

(Component C) Crosslinking Catalyst

The resin composition for laser engraving of the present invention preferably comprises (Component C) a crosslinking catalyst.

(Component C) The crosslinking catalysts that can be used in the present invention preferably comprises (Component C-1) an alcohol exchange reaction catalyst, (Component C-2) a polymerization initiator, or (Component C-3) a curing agent which can form crosslinking structure after reacting with Component B-3.

The alcohol exchange reaction catalyst may be used without restrictions as long as it is a reaction catalyst normally used in a silane coupling reaction.

Representative examples of the alcohol exchange reaction catalyst, an acidic catalyst or basic catalyst, and a metal complex catalyst, are explained below.

—Acidic Catalyst or Basic Catalyst—

As the acidic catalyst and the basic catalyst, it is preferable to use an acidic or basic compound as it is or in the form of a solution in which it is dissolved in a solvent such as water or an organic solvent (hereinafter, called an acidic catalyst or basic catalyst respectively). The concentration when dissolved in a solvent is not particularly limited, and it may be selected appropriately according to the properties of the acidic or basic compound used, desired catalyst content, etc.

The type of acidic catalyst and basic catalyst is not particularly limited; specific examples thereof include, as the acidic catalyst, a hydrogen halide such as hydrochloric acid, nitric acid, sulfuric acid, sulfurous acid, hydrogen sulfide, perchloric acid, hydrogen peroxide, carbonic acid, a carboxylic acid such as formic acid or acetic acid, a substituted carboxylic acid in which R of the structural formula RCOOH is substituted with another element or substituent, a sulfonic acid such as benzenesulfonic acid, phosphoric acid, a heteropoly acid, and an inorganic solid acid and, as the basic catalyst, an ammoniacal base such as aqueous ammonia, an amine such as ethylamine or aniline, an alkali metal hydroxide, an alkali metal alkoxide, an alkaline earth oxide, a quaternary ammonium salt compound, and a quaternary phosphonium salt compound.

Examples of the amines used as the basic catalyst in the present invention are listed below.

Examples of the amines include the compounds (a) to (e) below.

(a) a hydrogenated nitrogen compound such as hydrazine;

(b) monoamines or polyamines, such as diamines or triamines, which is primary, secondary, or tertiary amines of an aliphatic, aromatic, or alicyclic or amines;

(c) monoamines or polyamines which is a condensed ring-containing cyclic amine having at least one nitrogen atom in a ring skeleton;

(d) an oxygen-containing amine such as an amino acid, an amide, an alcoholamine, an ether amine, an imide or a lactam; and (e) a heteroelement-containing amine having a heteroatom such as O, S or Se.

Here, in the case of the secondary or tertiary amine, each substituent of a nitrogen atom (N) may be mutually the same, may be different respectively, and among these substituents, one or more may be different, and the others may be the same.

Specifically, the amines include hydrazine.

As primary amines; such as monomethylamine, monoethylamine, monopropylamines, monobutylamines, monopentylamines, monohexylamines, monoheptylamines, vinylamine, allylamine, butenylamines, pentenylamines, hexenylamines, pentadienylamines, hexadienylamines, cyclopentylamine, cyclohexylamine, cyclooctylamine, p-menthylamine, cyclopentenylamines, cyclohexenylamines, cyclohexadienylamines, aniline, benzylamine, naphthylamine, naphthylmethylamine, toluidine, tolylenediamines, anisole, ethylenediamine, ethylenetriamine, monoethanolamine, aminothiophene, glycine, alanine, phenylalanine, aminoacetone.

Furthermore, secondary amines include such as dimethylamine, diethylamine, dipropylamines, dibutylamines, dipentylamines, dihexylamines, methylethylamine, methylpropylamines, methylbutylamines, methylpentylamines, methylhexylamines, ethylpropylamines, ethylbutylamines, ethylpentylamines, propylbutylamines, propylpentylamines, propylhexylamines, butylpentylamines, pentylhexylamines, divinylamine, diallylamine, dibutenylamines, dipentenylamines, dihexenylamines, methylvinylamine, methylallylamine, methylbutenylamines, methylpentenylamines, methylhexenylamines, ethylvinylamines, ethylallylamine, ethylbutenylamine, ethylpentenylamines, ethylhexenylamines, propylvinylamines, propylallylamines, propyl butenylamines, propylpentenylamines, propylhexenylamines, butylvinylamines, butylallylamines, butylbutenylamines, butylpentenylamines, butylhexenylamines, vinylallylamine, vinylbutenylamines, vinylpentenylamines, vinylhexenylamines, allylbutenylamines, allylpentenylamines, allylhexenylamines, butenylpentenylamines, butenylhexenylamines, dicyclopentylamine, dicyclohexylamine, methylcyclopentylamine, methylcyclohexylamine, methylcyclooctylamine, ethylcyclopentylamine, ethyl cyclohexylamine, ethylcyclooctylamine, propylcyclopentylamines, propyl cyclohexylamines, butylcyclopentylamines, butylcyclohexylamines, hexylcyclopentylamines, hexylcyclohexylamines, hexylcyclooctylamines, vinylcyclopentylamine, vinylcyclohexylamine, vinylcyclooctylamine, allylcyclopentylamine, allylcyclohexylamine, allylcyclooctylamine, butenylcyclopentylamines, butenylcyclohexylamines, butenylcyclooctylamines, dicyclopentenylamines, dicyclohexenylamines, dicyclooctenylamines, methylcyclopentenylamines, methylcyclohexenylamines, methylcyclooctenylamines, ethylcyclopentenylamines.

ethylcyclohexenylamines, ethylcyclooctenylamines, propylcyclopentenylamines, propylcyclohexenylamines, butylcyclopentenylamines, butylcyclohexenylamines, vinylcyclopentenylamines, vinylcyclohexenylamines, vinylcyclooctenylamines, ailylcyclopentenylamines, allylcyclohexenylamines, butenylcyclopentenylamines, butenylcyclohexenylamines, dicyclopentadienylamines, dicyclohexadienylamines, dicyclooctadienylamines, methylcyclopentadienylamines, methylcyclohexadienylamines, ethylcyclopentadienylamines, ethylcyclohexadienylamines, propylcyclopentadienylamines, propylcyclohexadienylamines, dicyclooctatrienylamines, methylcyclooctatrienylamines, ethylcyclooctatrienylamines, vinylcyclopentadienylamines, vinylcyclohexadienylamines, allylcyclopentadienylamines, allylcyclohexadienylamines, diphenylamine, ditolylamines, dibenzylamine, dinaphthylamines, N-methylaniline, N-ethylaniline, N-propylanilines, N-butylanilines, N-methyltoluidine, N-ethyltoluidine, N-propyltoluidines, N-butyltoluidines, N-methylbenzylamine, N-ethylbenzylamines, N-propylbenzylamines, N-butylbenzylamines, N-methylnaphthylamines, N-ethylnaphthylamines, N-propylnaphthylamines, N-vinylaniline, N-allylaniline, N-vinylbenzylamine, N-allylbenzylamine, N-vinyltoluidine, N-allyltoluidine, phenylcyclopentylamine, phenylcyclohexylamine, phenylcyclooctylamine, phenylcyclopentenylamine, phenylcyclohexenylamine, phenylcyclopentadienylamine, N-methylanisole, N-ethylanisole, N-vinylanisole, N-allylanisole, N-methylethylenediamine, N,N'-dimethylethylenediamine, N-ethylethylenediamine, N,N'-diethylethylenediamine, N,N'-dimethyltolylenediamines, N,N'-diethyltolylenediamines, N-methylethylenetriamine, N,N'-dimethylethylenetriamine, pyrrole, pyrrolidine, imidazole, piperidine, piperazine, methylpyrroles, methylpyrrolidines, methylimidazoles, methylpiperidines, methylpiperazines, ethylpyrroles, ethylpyrrolidines, ethylimidazoles, ethylpiperidines, ethylpiperazines, phthalimide, maleinimide, caprolactam, pyrrolidone, morpholine, N-methylglycine, N-ethylglycine, N-methylalanine, N-ethylalanine, N-methyl-aminothiophene, N-ethylaminothiophene, 2,5-piperazinedione, N-methylethanolamine, N-ethylethanolamine, and purine.

Moreover, tertiary amines include such as trimethylamine, triethylamine, tripropylamines, tributylamines, tripentylamines, trihexylamines, dimethylethylamine, dimethylpropylamines, dimethylbutylamines, dimethylpentylamines, dimethylhexylamines, diethylpropylamines, diethylbutylamines, diethylpentylamines, diethylhexylamines, dipropylbutylamines, dipropylpentylamines, dipropylhexylamines, dibutylpentylamines, dibutylhexylamines, dipentylhexylamines, methyldiethylamine, methyldipropylamines, methyldibutylamines, methyldipentylamines, methyldihexylamines, ethyldipropylamines, ethyldibutylamines, ethyldipentylamines, ethyldihexylamines, propyldibutylamines, propyldipentylamines, propyldihexylamines, butyldipentylamines, butyldihexylamines, pentyldihexylamines, methylethylpropylamines, methylethylbutylamines, methylethylhexylamines, methylpropylbutylamines, methylpropylhexylamines, ethylpropylbutylamine, ethylbutylpentylamines, ethylbutylhexylamines, propylbutylpentylamines, propylbutylhexylamines, butylpentylhexylamines, trivinylamine, triallylamine, tributenylamines, tripentenylamines, trihexenylamines, dimethylvinylamine, dimethylallylamine, dimethylbutenylamines, dimethylpentenylamines, diethylvinylamine, diethylallylamine, diethylbutenylamines, diethylpentenylamines, diethylhexenylamines, dipropylvinylamines, dipropylallylamines, dipropylbutenylamines, methyldivinylamine, methyldiallylamine, methyldibutenylamines, ethyldivinylamine, ethyldiallylamine, tricyclopentylamine, tricyclohexylamine, tricyclooctylamine, tricyclopentenylamine, tricyclohexenylamine, tricyclopentadienylamine, tricyclohexadienylamines, dimethylcyclopentylamine, diethylcyclopentylamine, dipropylcyclopentylamines, dibutylcyclopentylamines, dimethylcyclohexylamine, diethylcyclohexylamine, dipropylcyclohexylamines, dimethylcyclopentenylamines, diethylcyclopentenylamines, dipropylcyclopentenylamines, dimethylcyclohexenylamines, diethylcyclohexenylamines, dipropylcyclohexenylamines, methyldicyclopentylamines, ethyldicyclopentylamines, propylcyclopentylamines, methyldicyclohexylamines, ethyldicyclohexylamines, propylcyclohexylamines, methyldicyclopentenylamines, ethyldicyclopentenylamines, propyldicyclopentenylamines, N,N-dimethylaniline, N,N-dimethylbenzylamine, N,N-dimethyltoluidines, N,N-dimethylnaphthylamines, N,N-diethylaniline, N,N-diethylbenzylamine, N,N-diethyltoluidines, N,N-diethylnaphthylamines, N,N-dipropylanilines, N,N-dipropylbenzylamines, N,N-dipropyltoluidines, N,N-dipropylnaphthylamines, N,N-divinylaniline, N,N-diallylaniline, N,N-divinyltoluidines, N,N-diallylaniline, diphenylmethylamine, diphenylethylamine, diphenylpropylamines, dibenzylmethylamine, dibenzylethylamine, dibenzylcyclohexylamine, dibenzylvinylamine, dibenzylallylamine, ditolylmethylamines, ditolylethylamines, ditolylcyclohexylamines, ditolylvinylamines, triphenylamine, tribenzylamine, tri(tolyl)amines, trinaphthylamines, N,N,N',N'-tetramethylethylenediamine, N,N,N',N'-tetraethylethylenediamine, N,N,N',N'-tetramethyltolylenediamines, N,N,N',N'-tetraethyltolylenediamines, N-methylpyrrole, N-methylpyrrolidine, N-methylimidazole, N,N'-dimethylpiperazine, N-methylpiperidine, N-ethylpyrrole, N-methylpyrrolidine, N-ethylimidazole, N,N'-diethylpiperazine, N-ethylpiperidine, pyridine, pyridazine, pyrazine, quinoline, quinazoline, quinuclidine, N-methylpyrrolidone, N-methylmorpholine, N-ethylpyrrolidone, N-ethylmorpholine, N,N-dimethylanisole, N,N-diethylanisole, N,N-dimethylglycine, N,N-diethylglycine, N,N-dimethylalanine, N,N-diethylalanine, N,N-dimethylethanolamine, N,N-dimethylaminothiophene, 1,1,3,3-tetramethylguanidine, 1,8-diazabicyclo[5,4,0]undec-7-ene, 1,5-diazabicyclo[4.3.0]non-5-ene, 1,4-diazabicyclo[2.2.2]octane, and hexamethylenetetramine.

Therefore, as the amine that can be used as the basic catalyst it is preferable that it is a compound in which an aliphatic or alicyclic, saturated or unsaturated hydrocarbon group; aromatic hydrocarbon group; oxygen-containing and/or sulfur-containing and/or selenium-containing hydrocarbon group or the like is bonded to one or more nitrogen atoms. From the viewpoint of film strength after thermal crosslinking, the range of preferable pKaH (acid dissociation constant of conjugate acid) as an amine is preferably 7 or more, more preferably 10 or more.

Among the above-mentioned acidic or basic catalysts, from the viewpoint of an alcohol exchange reaction progressing quickly in the film, methanesulfonic acid, p-toluenesulfonic acid, pyridinium p-toluenesulfonate, dodecylbenzenesulfonic acid, phosphoric acid, phosphonic acid, acetic acid, 1,8-diazabicyclo[5.4.0]undec-7-ene, 1,5-diazabicyclo[4.3.0]non-5-ene, and 1,1,3,3-tetramethylguanidine are preferable, and phosphoric acid, polyethyleneimine, 1,8-diazabicyclo[5.4.0]undec-7-ene), and 1,5-diazabicyclo[4.3.0]non-5-ene are particularly preferable.

—Metal Complex Catalyst—

The metal complex catalyst that can be used as an alcohol exchange reaction catalyst in the present invention is preferably constituted from a metal element selected from Groups 2, 4, 5, and 13 of the periodic table and an oxo or hydroxy oxygen compound selected from β-diketones, ketoesters, hydroxycarboxylic acids and esters thereof, amino alcohols, and enolic active hydrogen compounds.

Furthermore, among the constituent metal elements, a Group 2 element such as Mg, Ca, Sr, or Ba, a Group 4 element such as Ti or Zr, a Group 5 element such as V, Nb, or Ta, and a Group 13 element such as Al or Ga are preferable, and they form a complex having an excellent catalytic effect. Among them, a complex obtained from Zr, Al, or Ti (ethyl orthotitanate, etc.) is excellent and preferable.

In the present invention, examples of the oxo or hydroxy oxygen-containing compound constituting a ligand of the above-mentioned metal complex include β-diketones such as acetylacetone (2,4-pentanedione) and 2,4-heptanedione, ketoesters such as methyl acetoacetate, ethyl acetoacetate, and butyl acetoacetate, hydroxycarboxylic acids and esters thereof such as lactic acid, methyl lactate, salicylic acid, ethyl salicylate, phenyl salicylate, malic acid, tartaric acid, and methyl tartarate, ketoalcohols such as 4-hydroxy-4-methyl-2-pentanone, 4-hydroxy-2-pentanone, 4-hydroxy-4-methyl-2-pentanone, and 4-hydroxy-2-heptanone, amino alcohols such as monoethanolamine, N,N-dimethylethanolamine, N-methylmonoethanolamine, diethanolamine, and triethanolamine, enolic active compounds such as methylolmelamine, methylolurea, methylolacrylamide, and diethyl malonate ester, and compounds having a substituent on the methyl group, methylene group, or carbonyl carbon of acetylacetone.

A preferred ligand is an acetylacetone derivative, and the acetylacetone derivative in the present invention means a compound having a substituent on the methyl group, methylene group, or carbonyl carbon of acetylacetone. The substituent with which the methyl group of acetylacetone is substituted is a straight-chain or branched alkyl group, acyl group, hydroxyalkyl group, carboxyalkyl group, alkoxy group, or alkoxyalkyl group that all have 1 to 3 carbon atoms, the substituent with which the methylene carbon of acetylacetone is substituted is a carboxy group or a straight-chain or branched carboxyalkyl group or hydroxyalkyl group having 1 to 3 carbon atoms, and the substituent with which the carbonyl carbon of acetylacetone is substituted is an alkyl group having 1 to 3 carbon atoms, and in this case the carbonyl oxygen turns into a hydroxy group by addition of a hydrogen atom.

Specific preferred examples of the acetylacetone derivative include acetylacetone, ethylcarbonylacetone, n-propylcarbonylacetone, i-propylcarbonylacetone, diacetylacetone, 1-acetyl-1-propionylacetylacetone, hydroxyethylcarbonylacetone, hydroxypropylcarbonylacetone, acetoacetic acid, acetopropionic acid, diacetoacetic acid, 3,3-diacetopropionic acid, 4,4-diacetobutyric acid, carboxyethylcarbonylacetone, carboxypropylcarbonylacetone, and diacetone alcohol, and among them acetylacetone and diacetylacetone are preferable. The complex of the acetylacetone derivative and the metal element is a mononuclear complex in which 1 to 4 molecules of acetylacetone derivative coordinate to one metal element, and when the number of coordinatable sites of the metal element is larger than the total number of coordinatable bond sites of the acetylacetone derivative, a ligand that is usually used in a normal complex, such as a water molecule, a halide ion, a nitro group, or an ammonio group may coordinate thereto.

Preferred examples of the metal complex include a tris(acetylacetonato)aluminum complex salt, a di(acetylacetonato)aluminum-aqua complex salt, a mono(acetylacetonato)aluminum-chloro complex salt, a di(diacetylacetonato)aluminum complex salt, ethyl acetoacetate aluminum diisopropylate, aluminum tris(ethyl acetoacetate), cyclic aluminum oxide isopropylate, a tris(acetylacetonato)barium complex salt, a di(acetylacetonato)titanium complex salt, a tris(acetylacetonato)titanium complex salt, a di-i-propoxy-bis(acetylacetonato)titanium complex salt, zirconium tris(ethyl acetoacetate), and a zirconium tris(benzoic acid) complex salt. They are excellent in terms of stability in a coating solution, and among them ethyl acetoacetate aluminum diisopropylate, aluminum tris(ethyl acetoacetate), a di(acetylacetonato)titanium complex salt, and zirconium tris(ethyl acetoacetate) are particularly preferable.

(Component C-2) Polymerization Initiator

In order to facilitate the formation of crosslinking structures, the resin composition for laser engraving of the present invention preferably comprises (Component C-2) a polymerization initiator, and more preferably contains (Component B-2) a polyfunctional ethylenically unsaturated compound and (Component C-2) a polymerization initiator.

As the polymerization initiator well-known examples among those known art may be used without particular limitations. Hereinafter, although the radical polymerization initiator which is a preferable polymerization initiator will be described, the present invention is not limited by this description.

In the present invention, preferable radical polymerization initiators include (a) aromatic ketones, (b) onium salt compounds, (c) organic peroxides, (d) thio compounds, (e) hexaallylbiimidazole compounds, (f) ketoxime ester compounds, (g) borate compounds, (h) azinium compounds, (i) metallocene compounds, (j) active ester compounds, (k) compounds having a carbon halogen bond, and (l) azo compounds. Hereinafter, although specific examples of the (a) to (l) are cited, the present invention is not limited to these.

In the present invention, when applies to the relief-forming layer of the relief printing plate precursor, from the viewpoint of engraving sensitivity and making a favorable relief edge shape, (c) organic peroxides and (l) azo compounds are more preferable, and (c) organic peroxides are particularly preferable.

The (a) aromatic ketones, (b) onium salt compounds, (d) thio compounds, (e) hexaallylbiimidazole compounds, (f) ketoxime ester compounds, (g) borate compounds, (h) azinium compounds, (i) metallocene compounds, (j) active ester compounds, and (k) compounds having a carbon halogen bonding may preferably include compounds described in paragraphs 0074 to 0118 of JP-A-2008-63554.

Moreover, (c) organic peroxides and (l) azo compounds are preferably include the following compounds.

(c) Organic Peroxides

Preferable (c) organic peroxides as a radical polymerization initiator that can be used in the present invention include preferably a peroxide ester such as 3,3',4,4'-tetra (t-butylperoxycarbonyl)benzophenone, 3,3',4,4'-tetra(t-amylperoxycarbonyl)benzophenone, 3,3',4,4'-tetra(t-hexylperoxycarbonyl)benzophenone, 3,3',4,4'-tetra(t-octylperoxycarbonyl)benzophenone, 3,3',4,4'-tetra(cumylperoxycarbonyl)benzophenone, 3,3',4,4'-tetra(p-isopropylcumylperoxycarbonyl)benzophenone and di-t-butyldiperoxyisophthalate.

(l) Azo Compounds

Preferable (l) azo compounds as a radical polymerization initiator that can be used in the present invention include those such as 2,2'-azobisisobutyronitrile, 2,2'-azobispropionitrile, 1,1'-azobis(cyclohexane-1-carbonitrile), 2,2'-azobis(2-methylbutyronitrile), 2,2'-azobis(2,4-dimethylvaleronitrile), 2,2'-azobis(4-methoxy-2,4-dimethylvaleronitrile), 4,4'-azobis(4-cyanovaleric acid), dimethyl 2,2'-azobis(isobutyrate), 2,2'-azobis(2-methylpropionamideoxime), 2,2'-azobis[2-(2-imidazolin-2-yl)propane], 2,2'-azobis{2-methyl-N-[1,1-bis(hydroxymethyl)-2-hydroxyethyl]propionamide}, 2,2'-azobis[2-methyl-N-(2-hydroxyethyl)propionamide], 2,2'-azobis(N-butyl-2-methylpropionamide), 2,2'-azobis(N-cyclohexyl-2-methylpropionamide), 2,2'-azobis[N-(2-propenyl)-2-methyl-propionamide], 2,2'-azobis(2,4,4-trimethylpentane).

In addition, in the present invention, the (c) organic peroxides as a polymerization initiator of the invention are preferable from the viewpoint of membranous (relief-forming layer) crosslinking property, furthermore, as an unexpected effect, a particularly preferable effect was found from the viewpoint of the improvement in engraving sensitivity.

An embodiment that combines (c) the organic peroxides and the polymer which has a glass transition temperature higher than room temperature (25° C.) as Component A from the viewpoint of engraving sensitivity is particularly preferable.

This is because when the relief-forming layer is cured by thermal crosslinking by using an organic peroxide, the unreacted organic peroxide which does not participate in radical generating remains, but residual organic peroxide acts as an additive agent with a self-reactive property, and it decomposes exothermically at the time of laser engraving. As a result, since a generated heat part is added to the irradiated laser energy, it is presumed that engraving sensitivity becomes high.

Specifically, when Component A has a glass transition temperature higher than room temperature (25° C.), since the heat which is generated deriving from the decomposition of the organic peroxide is efficiently transmitted to Component A, it is used effectively in the thermal decomposition of Component A itself. Thus, it is presumed that it becomes more highly sensitive.

Furthermore, although detailed explanation is given at explanation of a photothermal conversion agent, this effect is remarkable when using carbon black as a photothermal conversion agent. Since heat is generated not only from carbon black but from an organic peroxide as a result of transmitting the heat which is generated from carbon black also to (c) organic peroxide, this is considered in order that the generation of the thermal energy which should be used for decomposition of Component A or the like occurs synergistically.
(Component C-3) Curing Agent which Reacts with Component B-3 and can Form a Crosslinking Structure In order to facilitate the formation of crosslinking structures, the resin composition for laser engraving of the present invention preferably contains (Component B-3) the compound having two or more ring structures selected from the group consisting of an epoxy ring, an oxetane ring, and a five-membered carbonate ring, and (Component C) a curing agent which reacts with Component B-3 and can form a crosslinking structure.

Component C-3, from the viewpoint that progress of a reaction is quick and a high intensity film is obtained, is preferably a compound which has one or more functional groups selected from the group consisting of a primary amino group and an acid anhydride group, or a compound which has two or more functional groups selected from the group consisting of a secondary amino group, a mercapto group, a carboxyl group, a phenolic hydroxyl group, and a hydroxyl group, more preferably a compound which has one or more functional groups selected from the group consisting of a primary amino group and an acid anhydride group, or a compound which has two or more functional groups selected from the group consisting of the secondary amino group and a mercapto group, and yet more preferably a compound which has one or more functional groups selected from the group consisting of a primary amino group and an acid anhydride group.

The compound having at least one primary amino group is not particularly limited, and various compounds may be used.

Examples thereof include primary alkylamines such as butylamine, octylamine, oleylamine, and 2-ethylhexylamine; primary anilines such as aniline, 4-aminoacetophenone, p-anisidine, 2-aminoanthracene, and 1-naphthylamine; primary alkanolamines such as monoethanolamine, 2-ethoxyethanolamine and 2-hydroxypropanolamine; aliphatic polyamines such as hexanediamine, ethylenediamine, diethylenetriamine, triethylenetetramine, tetraethylenepentamine, m-xylenediamine, and p-xylenediamine; alicyclicpolyamines such as 1,3-diaminocyclohexane and isophoronediamine; polyanilines such as 1,4-phenylenediamine, 2,3-diaminonaphthalene, 2,6-diaminoanthraquinone, 2,2-bis(4-aminophenyl)hexafluoropropane, and 4,4'-diaminobenzophenone, 4,4'-diaminodiphenylmethane; a Mannich base consisting of a polycondensate of polyamines, an aldehyde compound, and monohydric phenols or polyhydric phenols; and polyamide polyamines obtained by the reaction of polyamines, and polycarboxylic acid or dimer acids.

Among these, from the viewpoint of being suitable for carrying out the situation of the advanced three-dimensional crosslinking, aliphatic polyamines, alicyclic polyamines, and polyanilines are preferable, in particularly, hexanediamine, triethylenetetramine, m-xylenediamine, and 4,4'-diaminodiphenylmethane are more preferable.

The compound having at least two secondary amino groups is not particularly limited, and various compounds may be used.

Examples thereof include such as N,N'-dimethylethylenediamine, N,N'-diethylethylenediamine, N,N'-dibenzylethylenediamine, N,N'-diisopropylethylenediamine, 2,5-dimethylpiperazine, N,N'-dimethylcyclohexan-1,2-diamine, piperazine, homopiperazine, and 2-methylpiperazine.

The compound having at least one acid anhydride group is not particularly limited, and various compounds may be used.

For example, acid anhydride compounds, such as succinic anhydride, maleic anhydride, phthalic anhydride, hexahydrophalic anhydride, methyl hexahydrophthalic anhydride, nadic anhydride, hydrogenated nadic anhydride, trimellitic anhydride, and pyromellitic dianhydride, can be used. Among these, by using methyl hexahydrophthalic anhydride which is particularly preferable, a cured film with little hardening shrinkage, transparency, and high strength can be obtained.

The compound having at least two mercapto groups is not particularly limited, and various compounds may be used.

Examples of these include alkanedithiols such as 1,2-ethanedithiol, 1,3-propanedithiol, 1,4-butanedithiol, 1,5-pentanedithiol, 1,6-hexanedithiol, 1,7-heptanedithiol, 1,8-octanedithiol, 1,9-nonanedithiol, 1,10-decanedithiol, 1,12-dodecanedithiol, 2,2-dimethyl-1,3-propanedithiol, 3-methyl-1,5-pentanedithiol, and 2-methyl-1,8-octanedithiol; cycloalkanedithiols such as 1,4-cyclohexanedithiol; alkanedithiols containing a hetero atom in the carbon chain such as bis(2-mercaptoethyl) ether, bis(2-mercaptoethyl) sulfide, bis(2-mercaptoethyl)disulfide, and 2,2'-(ethylenedithio)diethanethiol; alkanedithiols containing a hetero atom and an alicyclic structure in the carbon chain such as 2,5-bis(mercaptomethyl)-1,4-dioxane, 2,5-bis(mercaptomethyl)-1,4-dithiane; alkanetrithiols such as 1,1,1-tris(mercaptomethyl)ethane, 2-ether-2-mercaptomethyl-1,3-propanedithiol, and 1,8-mercapto-4-mercaptomethyl-3,6-thiaoctane; and alkanetetrathiols such as tetrakis(mercaptomethyl)methane, 3,3'-thiobis(propane-1,2-dithiol), and 2,2'-thiobis(propane-1,3-dithiol).

The compound having at least two carboxyl groups is not particularly limited, and various compounds may be used.

Examples of these include such as succinic acid, maleic acid, phthalic acid, hexahydrophthalic acid, methylhexahydrophthalic acid, nadic acid, hydrogenated nadic acid, trimellitic acid, pyromellitic acid, adipic acid, sebacic acid, dodecane dicarboxylic acid, isophthalic acid, 2-methylterephthalic acid, and naphthalene dicarboxylic acid.

The compound having at least two phenolic hydroxy groups is not particularly limited, and various compounds may be used.

Examples of these include novolac type resins such as phenol novolac resin, cresol novolac resin, and naphthol novolac resin; polyfunctional type phenol resins such as triphenylmethane type resins; modified phenol resins such as dicyclopentadiene modified phenol resin, and terpene modified phenol resin; aralkyl type resins such as phenol aralkyl resins having a phenylene skeleton, phenol aralkyl resins having a biphenylene skeleton, naphthol aralkyl resins having a phenylene skeleton, and naphthol aralkyl resin having a biphenylene skeleton; bisphenol compound such as bisphenol A, and bisphenol F; and phenol resin containing sulfur atom such as bisphenol S.

The compound having at least two hydroxyl group is not particularly limited, and various compounds may be used.

Examples of these include polyalkylene glycols such as ethylene glycol, diethylene glycol, propylene glycol, dipropylene glycol, trimethylene glycol, 1,4-tetramethylene diol, 1,3-tetramethylene diol, 2-methyl-1,3-trimethylene diol, 1,5-pentamethylene diol, neopentyl glycol, 1,6-hexamethylene diol, 3-methyl-1,5-pentamethylene diol, 2,4-diethyl-1,5-pentamethylene diol, glycerin, trimethylolpropane, trimethylolethane, cyclohexanediols (1,4-cyclohexandiol or the like), bisphenols (such as bisphenol A), sugar alcohols (such as xylitol and sorbitol), polyethylene glycol, polypropylene glycol, and polytetramethylene glycol.

The compounds shown below can be cited as preferred examples of Component C-3, but the present invention should not be construed as being limited thereto.

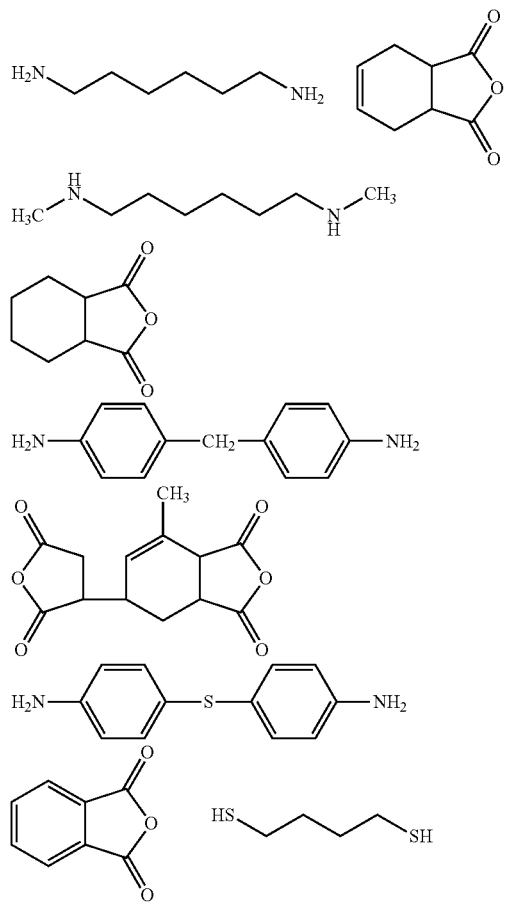

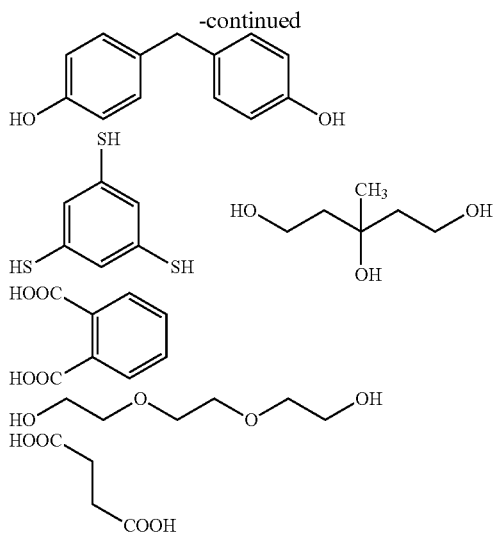

-continued

Further, from the viewpoint of further exhibiting the effects of the present invention, as the combination of Component B-3 and Component C-3, it is preferable that Component B-3 be a compound having two or more epoxy rings or two or more oxetane rings and Component C-3 be a compound having one or more functional groups selected from a group consisting of a primary amino group and an acid anhydride group or a compound having two or more functional groups selected from a group consisting of a secondary amino group, a mercapto group, a carboxyl group, a phenolic hydroxyl group, and a hydroxyl group. It is more preferable that Component B-3 be a compound having two or more epoxy rings and Component C-3 be a compound having one or more functional groups selected from a group consisting of a primary amino group and an acid anhydride group or a compound having two or more functional groups selected from a group consisting of a secondary amino group, a mercapto group, a carboxyl group, a phenolic hydroxyl group, and a hydroxyl group. It is particularly preferable that Component B-3 be a compound having two or more epoxy rings and Component C-3 be a compound having one or more functional groups selected from a group consisting of a primary amino group and an acid anhydride group.

In addition, when Component B-3 and Component C-3 are used in combination, a ratio of the total molar quantity of an epoxy ring, an oxetane ring, and a 5-membered carbonate ring in Component B-3 to the total molar quantity of a functional group, such as a primary amino group in Component C-3, which can form a crosslinked structure by reacting with Component B-3 is preferably in the range of a functional group in Component B-3/a functional group in Component C-3=0.5 to 2.0, more preferably 0.7 to 1.5, and most preferably 0.8 to 1.2.

With regard to Component C in the resin composition for laser engraving of the present invention, one type may be used on its own, or two or more types may be used in combination.

As the content of Component C, relative to the total solid content of the resin composition, 0.01 to 40 wt % is preferable, 0.05 to 30 wt % is more preferable, and 0.1 to 20 wt % is yet more preferable.

As the total content of Component B and Component C, relative to the total solid content of the resin composition, 0.1 to 80 wt % is preferable, 1 to 60 wt % is more preferable, and 5 to 40 wt % is most preferable.

(Component D) Photothermal Conversion Agent Capable of Absorbing Light Having a Wavelength of 700 to 1,300 nm The resin composition for laser engraving of the present invention preferably further includes (Component D) a photothermal conversion agent capable of absorbing light having a wavelength of 700 to 1,300 nm (hereinafter, simply called "photothermal conversion agent"). That is, it is considered that the photothermal conversion agent in the present invention can promote the thermal decomposition of a cured material during laser engraving by absorbing laser light and generating heat. Therefore, it is preferable that a photothermal conversion agent capable of absorbing light having a wavelength of laser used for graving be selected.

When a laser (a YAG laser, a semiconductor laser, a fiber laser, a surface emitting laser, etc.) emitting infrared at a wavelength of 700 to 1,300 nm is used as a light source for laser engraving, it is preferable for the relief-forming layer in the present invention to comprise a photothermal conversion agent that has a maximum absorption wavelength at 700 to 1,300 nm.

As the photothermal conversion agent in the present invention, various types of dye or pigment are used.

With regard to the photothermal conversion agent, examples of dyes that can be used include commercial dyes and known dyes described in publications such as 'Senryo Binran' (Dye Handbook) (Ed. by The Society of Synthetic Organic Chemistry, Japan, 1970). Specific examples include dyes having a maximum absorption wavelength at 700 to 1,300 nm, such as azo dyes, metal complex salt azo dyes, pyrazolone azo dyes, naphthoquinone dyes, anthraquinone dyes, phthalocyanine dyes, carbonium dyes, diimmonium compounds, quinone imine dyes, methine dyes, cyanine dyes, squarylium colorants, pyrylium salts, and metal thiolate complexes.

In particular, cyanine-based colorants such as heptamethine cyanine colorants, oxonol-based colorants such as pentamethine oxonol colorants, and phthalocyanine-based colorants are preferably used. Examples include dyes described in paragraphs 0124 to 0137 of JP-A-2008-63554.

With regard to the photothermal conversion agent used in the present invention, examples of pigments include commercial pigments and pigments described in the Color Index (C.I.) Handbook, 'Saishin Ganryo Binran' (Latest Pigments Handbook) (Ed. by Nippon Ganryo Gijutsu Kyokai, 1977), 'Saishin Ganryo Ouyogijutsu' (Latest Applications of Pigment Technology) (CMC Publishing, 1986), 'Insatsu Inki Gijutsu' (Printing Ink Technology) (CMC Publishing, 1984).

Examples of the type of pigment include a black pigment, a yellow pigment, an orange pigment, a brown pigment, a red pigment, a purple pigment, a blue pigment, a green pigment, a fluorescent pigment, a metal powder pigment and, in addition, polymer-binding dyes. Specifically, an insoluble azo pigment, an azo lake pigment, a condensed azo pigment, a chelate azo pigment, a phthalocyanine type pigment, an anthraquinone type pigment, perylene and perinone type pigments, a thioindigo type pigment, a quinacridone type pigment, a dioxazine type pigment, an isoindolinone type pigment, a quinophthalone type pigment, a dye lake pigment, an azine pigment, a nitroso pigment, a nitro pigment, a natural pigment, a fluorescent pigment, an inorganic pigment, carbon black, etc. may be used. Among these pigments, carbon black is preferable.

Any carbon black, regardless of classification by ASTM (American Society for Testing and Materials) and application (e.g. for coloring, for rubber, for dry cell, etc.), may be used as long as dispersibility, etc. in the resin composition for laser engraving is stable. Carbon black includes for example furnace black, thermal black, channel black, lamp black, and acetylene black. In order to make dispersion easy, a black colorant such as carbon black may be used as color chips or a color paste by dispersing it in nitrocellulose or a binder in advance using, as necessary, a dispersant, and such chips and paste are readily available as commercial products.

In the present invention, it is possible to use carbon black having a relatively low specific surface area and a relatively low dibutyl phthalate (DBP) absorption and also finely divided carbon black having a large specific surface area. Preferred examples of carbon black include Printex (registered trademark) U, Printex (registered trademark) A, and Spezialschwarz (registered trademark) 4 (Degussa).

From the viewpoint of improving engraving sensitivity by efficiently transmitting heat generated by photothermal conversion to the surrounding polymer, etc., the carbon black that can be used in the present invention is preferably a conductive carbon black having a specific surface area of at least 150 $m^2/g$ and a DBP number of at least 150 mL/100 g.

This specific surface area is preferably at least 250 $m^2/g$, and particularly preferably at least 500 $m^2/g$. The DBP number is preferably at least 200 mL/100 g, and particularly preferably at least 250 mL/100 g. The above-mentioned carbon black may be acidic or basic carbon black. The carbon black is preferably basic carbon black. It is of course possible to use a mixture of different carbon blacks.

Conductive carbon black having a specific surface area of 150 to about 1,500 $m^2/g$ and a DBP number of 150 to about 550 mL/100 g is commercially available under names such as for example Ketjenblack (registered trademark) EC300J, Ketjenblack (registered trademark) EC600J (Akzo), Printex (registered trademark) XE (Degussa), Black Pearls (registered trademark) 2000 (Cabot), and Ketjen Black (Lion Corporation).

When carbon black is used as the photothermal conversion agent, thermal crosslinking is more preferable in point of the curability of the film, instead of the photo crosslinking using UV light etc., and, by the combination with the organic peroxide being (Component C-2) the polymerization initiator, which is the aforementioned preferable component for use in combination, the engraving sensitivity becomes extremely high, more preferably.

In the resin composition for laser engraving of the present invention, it is preferable that (Component C-2) the polymerization initiator and (Component D) the photothermal conversion agent capable of absorbing light having a wavelength of 700 to 1,300 nm be used in combination, and it is particularly preferable that (Component C-2) the polymerization initiator and carbon black be used in combination. In the above embodiment, during laser engraving, the polymerization initiator remaining in the crosslinked relief-forming layer is decomposed by heat generated from the photothermal conversion agent to promote the decomposition of Component A or the like, thereby improving the engraving sensitivity.

With regard to Component D in the resin composition for laser engraving of the present invention, one type may be used on its own, or two or more types may be used in combination.

The content of (Component D) the photothermal conversion agent capable of absorbing light having a wavelength of 700 to 1,300 nm in the resin composition for laser engraving of the present invention greatly varies depending on the molecular extinction coefficient inherent to the molecule, and, relative to the total solid content of the resin composition, 0.01 to 20 wt % is preferable, 0.05 to 10 wt % is more preferable, and 0.1 to 5 wt % is particularly preferable.

(Component E) Plasticizer

From the viewpoint of imparting flexibility which is needed for flexographic printing plate, the resin composition for laser engraving of the present invention preferably further comprises (Component E) a plasticizer.

A plasticizer known as a polymer plasticizer may be used without limitations; examples thereof include, as described in pp. 211 to 220 of 'Kobunshi Daijiten (Polymer Dictionary)' (first edition, 1994, Maruzen Co., Ltd.), an adipic acid derivative, an azelaic acid derivative, a benzoylic acid derivative, a citric acid derivative, an epoxy derivative, a glycol derivative, a hydrocarbon and a derivative thereof, an oleic acid derivative, a phosphoric acid derivative, a phthalic acid derivative, a polyester type, a ricinoleic acid derivative, a sebacic acid derivative, a stearic acid derivative, a sulfonic acid derivative, a terpene and a derivative thereof, and a trimellitic acid derivative, and from the viewpoint of the large ability of reducing a glass transition temperature, an adipic acid derivative, a citric acid derivative, and a phosphoric acid derivative are preferable.

As the adipic acid derivative, dibutyl adipate and 2-butoxyethyl adipate are preferable.

As the citric acid derivative, tributyl citrate is preferable.

As the phosphoric acid derivative, tributyl phosphate, tri(2-ethylhexyl)phosphate, tributoxyethyl phosphate, triphenyl phosphate, cresyldiphenyl phosphate, tricresyl phosphate, t-butylphenyl phosphate and ethylhexyldiphenyl phosphate are preferable.

With regard to Component E in the resin composition for laser engraving of the present invention, one type may be used on its own, or two or more types may be used in combination.

As the content of Component E of the resin composition for laser engraving, from the viewpoint of reducing a glass transition temperature to room temperature or lower, when taking the total weight of the resin composition as 100 weight %, 1 to 50 weight % is preferable, 3 to 40 weight % is more preferable, and 5 to 30 weight % is yet more preferable in terms of solid content.

(Component F) Fragrance

The resin composition for laser engraving of the present invention preferably comprises (Component F) a fragrance. A fragrance is effective in reducing odor when producing a relief printing plate precursor or when carrying out laser engraving.

When the resin composition for laser engraving of the present invention comprises (Component F) a fragrance, the odor of solvent evaporating when drying a liquid-form resin composition coated during production can be masked. Furthermore, unpleasant smell such as amine odor, ketone odor, aldehyde odor, or the foul burning smell of resin occurring when carrying out laser engraving can be masked.

In addition, preferably, the fragrance has an aromatic odor and can be readily dissolved in a compound having an amino group, a carbonyl group, or an aldehyde group. In order to effectively reduce odor and have further effective reaction, it is preferable that components of the fragrance have a chemical structure in which the components are well dissolved in a compound having an amino group, a carbonyl group, or an aldehyde group. With regard to the dissolving capability, a branched skeleton is preferable to a linear skeleton, and among these, a case where the fragrance is a hydrocarbon compound, an aldehyde compound, a ketone compound, an ester compound, or an alcohol compound exhibits a favorable dissolving capability. Further, in cases of a cyclic ketone compound and a cyclic ester compound, the compound having 4 to 20 carbon atoms exhibits favorable dissolving capability. In addition, since a compound having these structures is also effective in reducing sulfur odor, it is also useful for a resin composition including a compound having a sulfur atom.

As the fragrance, a known fragrance may be used by appropriate selection; one type of fragrance may be used on its own, or a plurality of fragrances may be used in combination.

The fragrance is preferably selected as appropriate according to the crosslinking agent, the polymer, the solvent, etc., and it is preferable to carry out optimization by combining known fragrances. Examples of the fragrance include fragrances described in 'Gosei Koryo—Kagaku To Shohin Chishiki—(Synthetic Fragrances—Chemistry and Product Knowledge—)' (Motoichi Indo, The Chemical Daily Co., Ltd.), 'Koryo Kagaku Nyumon (Introduction to Fragrance Chemistry)' (Shoji Watanabe, Baifukan), 'Kaori no Hyakka' (Encyclopedia of Fragrances) (Ed. by Japan Perfumery & Flavoring Association, Asakura Publishing Co., Ltd.), and 'Koryo Kagaku Soran II (Complete Fragrance Chemistry II) Isolated Fragrances/Synthetic Fragrances/Applications of Fragrances' (Hirokawa-Shoten Ltd.).

Moreover, as the fragrance, both of natural fragrance and synthetic fragrance can be used.

When focusing on the molecular structure of the fragrance, examples of the fragrance include hydrocarbons such as aliphatic hydrocarbons, terpene hydrocarbons, and aromatic hydrocarbons; alcohols such as aliphatic alcohols, terpene alcohols, and aromatic alcohols; ethers such as aliphatic ethers and aromatic ethers; oxides such as aliphatic oxides and terpenoid oxides; aldehydes such as aliphatic aldehydes, terpene aldehydes, alicyclic aldehydes, thioaldehydes, and aromatic aldehydes; ketones such as aliphatic ketones, terpene ketones, alicyclic ketones, aliphatic cyclic ketones, nonbenzenoid aromatic ketones, and aromatic ketones; acetals; ketals; phenols; phenol ethers; acids such as fatty acids, terpene carboxylic acids, alicyclic carboxylic acids, and aromatic carboxylic acids; acid amides; lactones such as aliphatic lactones, macrocyclic lactones, terpene lactones, alicyclic lactones, and aromatic lactones; esters such as aliphatic esters, furan-based carboxylic acid esters, aliphatic cyclic carbon acid esters, cyclohexyl carboxylic acid esters, terpene carboxylic acid esters, and aromatic carboxylic acid esters; and nitrogen containing compounds such as nitromusks, nitriles, amines, pyridines, quinolines, pyrrole, and indole.

Among these, typical examples thereof include acetyl cedrene, Iso E Super (trade name), ethyl isovalerate, benzyl isovalerate, ethylvanillin, ethylene brassylate, 1-octene-3-ol, Galaxolide (trade name), camphor, methyl cinnamate, geraniol, isobornyl acetate, geranyl acetate, benzyl acetate, linalyl acetate, Sandelol (trade name), cyclamen aldehyde, cyclopentadecanolide, citral, citronellal, citronellol, methyl dihydrojasmonate, cis-jasmone, damascone, terpineol, Tonalide (trade name), bacdanol, vanillin, hydroxycitronellal, phenylacetaldehyde, 2-phenylethanol, hexyl cinnamic aldehyde, cis-3-hexenol, heliotropin, methylatrarate, methylionone, menthol, ionone, linalool, Lyral (trade name), Kovanol (trade name), Lilial (trade name), rose oxide.

Among these, as the fragrance, terpenic compounds such as terpene hydrocarbons, terpene alcohols, terpenoid oxides, terpene aldehydes, terpene ketones, terpene carboxylic acids, terpene lactones, and terpene carboxylic acid esters and/or ester compounds such as aliphatic esters, furan-based carboxylic acid esters, aliphatic cyclic carbon acid esters, cyclohexyl carboxylic acid esters, terpene carboxylic acid esters, and aromatic carboxylic acid esters are preferably used.

With regard to Component F in the resin composition for laser engraving of the present invention, one type may be used on its own, or two or more types may be used in combination.

As the content of (Component F) the fragrance of the resin composition for laser engraving, relative to the total solid content of the resin composition, 0.003 to 1.5 wt % is preferable and 0.005 to 1.0 wt % is more preferable. In the above range, the masking effect is effectively exhibited, the aroma of the fragrance is appropriate, the work environment is improved, and the engraving sensitivity is excellent.

(Component G) Filler

The resin composition for laser engraving of the present invention preferably includes (Component G) a filler in order to improve the physical property of a cured film of the resin composition for laser engraving.

As the filler, known fillers can be used, for example, inorganic particles and organic resin particles.

Examples of the inorganic particles include carbon nanotubes, fullerene, graphite, silica, alumina, aluminum, and calcium carbonate.

As the organic resin particles, known organic resin particles can be used and a preferred example thereof is a thermally expandable microcapsule.

An example of the thermally expandable microcapsule is EXPANCEL (manufactured by Akzo Nobel).

With regard to Component G in the resin composition for laser engraving of the present invention, one type may be used on its own, or two or more types may be used in combination.

As the content in (Component G) the filler of the resin composition for laser engraving of the present invention, relative to the total solid content of the resin composition, 0.01 to 20 wt % is preferable, 0.05 to 10 wt % is more preferable, and 0.1 to 5 wt % is particularly preferable.

(Component H) Monofunctional Ethylenically Unsaturated Compound

The resin composition for laser engraving of the present invention may include (Component H) a monofunctional ethylenically unsaturated compound, and when including (Component H) the monofunctional ethylenically unsaturated compound, it is preferable that (Component B-2) the polyfunctional ethylenically unsaturated compound be used in combination therewith.

Examples of a monofunctional ethylenically unsaturated compound having one ethylenically unsaturated bond in the molecule include esters of an unsaturated carboxylic acid (for example, acrylic acid, methacrylic acid, itaconic acid, crotonic acid, isocrotonic acid, and maleic acid) and a monovalent alcohol compound, and amides of an unsaturated carboxylic acid and a monovalent amine compound.

In addition, addition reaction products of unsaturated carboxylic acid esters or amides having a nucleophilic substituent such as a hydroxyl group, an amino group, or a mercapto group with isocyanates or epoxides, and dehydrating condensation reaction products with a monofunctional or polyfunctional carboxylic acid, etc. are also used favorably.

Moreover, addition reaction products of unsaturated carboxylic acid esters or amides having an electrophilic substituent such as an isocyanato group or an epoxy group with alcohols, amines or thiols, and substitution reaction products of unsaturated carboxylic acid esters or amides having a leaving group such as a halogen group or a tosyloxy group with alcohols, amines, or thiols are also favorable.

Moreover, as another example, the use of compounds obtained by replacing the unsaturated carboxylic acid with an unsaturated phosphonic acid, styrene, vinyl ether or the like is also possible.

As the polymerizable compound, the above examples of compound and various known compounds can be used without any particular limitation, and for example, compounds disclosed in JP-A-2009-204962 may be used.

With regard to Component H in the resin composition for laser engraving of the present invention, one type may be used on its own, or two or more types may be used in combination.

As the total content in (Component H) the monofunctional ethylenically unsaturated compound of the resin composition for laser engraving of the present invention, from the viewpoint of the flexibility and brittleness of the crosslinked film, relative to the total solid content of the resin composition, 0.1 to 40 wt % is preferable and the range of 1 to 20 wt % is more preferable.

(Component I) Binder Polymer Other than Component A

The resin composition for laser engraving of the present invention may include (Component I) a binder polymer other than Component A (hereinafter, simply called "binder polymer"), but the content thereof is preferably lower than the content of Component A, more preferably lower than 50 wt % of Component A, yet more preferably lower than 10 wt % of Component A. In addition, it is most preferable not to include (Component I) the binder polymer other than Component A.

The binder polymer is a macromolecular component contained in the resin composition for laser engraving. Common high molecular compounds can appropriately be selected, one type thereof may be used on its own, or two or more types may be used in combination. In particular, when the resin composition for laser engraving is used as a printing plate precursor, it is preferable that the resin composition for laser engraving be selected in consideration of various performances such as laser engraving property, ink acceptance property, and engraving residue dispersibility.

The binder polymer may be selected and used from a polystyrene resin, polyester resin, polyamide resin, polysulfone resin, polyether sulfone resin, polyimide resin, hydroxyethylene unit-containing hydrophilic polymer, acrylic resin, acetal resin, epoxy resin, polycarbonate resin, rubber, thermoplastic elastomer, or the like.

For example, from the viewpoint of the laser engraving sensitivity, polymers having a partial structure capable of being thermally decomposed by exposure or heating are preferable. Examples of such polymers preferably include those described in JP-A-2008-163081, paragraph 0038. Moreover, for example, when the purpose is to form a film having softness and flexibility, a soft resin or a thermoplastic elastomer is selected. It is described in detail in JP-A-2008-163081, paragraphs 0039 to 0040. Furthermore, in a case where the resin composition for laser engraving is applied to the relief-forming layer in the relief printing plate precursor for laser engraving, from the viewpoint of easy preparation of the composition for the relief-forming layer, and the improvement of resistance properties for an oil-based ink in the obtained relief printing plate, the use of a hydrophilic or alcoholphilic polymer is preferable. As the hydrophilic polymer, those described in detail in JP-A-2008-163081, paragraph 0041 can be used.

In addition, when being used for the purpose of curing by heating and exposure and improving strength, a polymer having an ethylenically unsaturated bond in the molecule is preferably used.

As such a polymer, examples of the polymer having an ethylenically unsaturated bond at the main chain include SB(polystyrene-polybutadiene), SBS(polystyrene-polybutadiene-polystyrene), SIS(polystyrene-polyisoprene-polystyrene), and SEBS(polystyrene-polyethylene/polybutylene-polystyrene).

The polymer having an ethylenically unsaturated bond at the side chain can be obtained by introducing an ethylenically unsaturated group such as an allyl group, an acryloyl group, a methacryloyl group, a styryl group, and a vinyl ether group into a structure of binder polymer below. As a method of introducing an ethylenically unsaturated group into the side chain of the binder polymer, known methods may be employed, such as (1) a method in which structural units having a polymerizable group precursor obtained by bonding a protecting group with a polymerizable group are copolymerized with the polymer and the protecting group is eliminated to obtain a polymerizable group and (2) a method in which a high molecular compound having a plurality of reactive group such as a hydroxy group, an amino group, an epoxy group, and a carboxyl group is prepared and a compound having a group which can react with the reactive group and an ethylenically unsaturated group is introduced by polymer reaction. According to these methods, the amount of an ethylenically unsaturated group introduced into the high molecular compound can be controlled.

The binder polymer is preferably a binder polymer having a reactive functional group such as a hydroxyl group, a silanol group and a hydrolyzable silyl group.

In addition, in a case where the resin composition of the present invention contains Component B-1, it is more preferable that the resin composition of the present invention include a binder polymer having the above reactive functional group as the binder polymer, and it is yet more preferable that the resin composition of the present invention include a binder polymer having a hydroxyl group.

The above reactive functional group may be present at any locations in polymer molecules, but is preferably present at the side chain of the branched polymer. Preferred examples of such a polymer include a vinyl copolymer (copolymer of a vinyl monomer such as polyvinyl alcohol and polyvinyl acetal, and a derivative thereof) and an acrylic resin (copolymer of an acryl-based monomer such as hydroxyethyl(meth)acrylate, and a derivative thereof).

A method of introducing the reactive functional group into the binder polymer is not particularly limited, and a method of addition-(co)polymerizing or addition-polycondensating a monomer having the reactive functional group and a method in which, after synthesizing a polymer having a group which can be introduced into the reactive functional group, the polymer is introduced into the reactive functional group by polymer reaction are included thereto.

As the polymer of Component I, in particular, (Component I-1) a binder polymer having a hydroxyl group is preferably used and will be described below.

(Component I-1) Binder Polymer Having Hydroxyl Group

Hereinafter, as the binder polymer in the resin composition of the present invention, (Component I-1) a binder polymer having a hydroxyl group (hereinafter, if necessary, also referred to as a "specific polymer") is preferable. The specific polymer is preferably insoluble in water and soluble in alcohol having 1 to 4 carbon atoms.

As Component I-1 that gives a relief-forming layer satisfying both good durability properties for an aqueous ink and for a UV ink, and having a high engraving sensitivity and good film performance, polyvinyl acetal and derivatives thereof, acrylic resins having a hydroxyl group on a side chain, epoxy resins having a hydroxyl group on a side chain, etc. are preferably cited.

Component I-1 preferably has a glass transition temperature (Tg) of at least 20° C. It is particularly preferable for improvement of engraving sensitivity that it has a glass transition temperature (Tg) of at least 20° C. when combined with (Component D) a photothermal conversion agent capable of absorbing light having a wavelength of 700 to 1,300 nm, an optional component. A binder polymer having a glass transition temperature of at least 20° C. is also called a 'non-elastomer' below. The upper limit for the glass transition temperature of the polymer is not limited, but is preferably no greater than 200° C. from the viewpoint of ease of handling, and is more preferably at least 25° C. but no greater than 120° C.

When a polymer having a glass transition temperature of 20° C. (room temperature) or greater is used, a specific polymer is in a glass state at normal temperature. Because of this, compared with a case of the rubber state, thermal molecular motion is suppressed. In laser engraving, in addition to the heat given by a laser during laser irradiation, heat generated by the function of (Component D) a photothermal conversion agent added as desired is transmitted to the surrounding specific polymer, and this polymer is thermally decomposed and disappears, thereby forming an engraved recess.

When a specific polymer is used, it is surmised that when a photothermal conversion agent is present in a state in which thermal molecular motion of a specific polymer is suppressed, heat transfer to and thermal decomposition of the specific polymer occur effectively. It is anticipated that such an effect further increases the engraving sensitivity.

Specific examples of polymers that are non-elastomer for use preferably in the present invention are cited below.

(1) Polyvinyl Acetal and its Derivative

Polyvinyl acetal is a compound obtained by converting polyvinyl alcohol (obtained by saponifying polyvinyl acetate) into a cyclic acetal. The polyvinyl acetal derivative is a derivative obtained by modifying the polyvinyl acetal or adding another copolymer constituent.

The acetal content in the polyvinyl acetal derivative (mole % of vinyl alcohol units converted into acetal relative to the total number of moles of vinyl acetate monomer starting material as 100 mole %) is preferably 30 to 90 mole %, more preferably 50 to 85 mole %, and particularly preferably 55 to 78 mole %.

The vinyl alcohol unit in the polyvinyl acetal is preferably 10 to 70 mole % relative to the total number of moles of the vinyl acetate monomer starting material, more preferably 15 to 50 mole %, and particularly preferably 22 to 45 mole %.

Furthermore, the polyvinyl acetal may have a vinyl acetate unit as another component, and the content thereof is preferably 0.01 to 20 mole %, and more preferably 0.1 to 10 mole %. The polyvinyl acetal derivative may further have another copolymerized constitutional unit.

Examples of the polyvinyl acetal include polyvinyl butyral, polyvinyl propylal, polyvinyl ethylal, and polyvinyl methylal. Among them, polyvinyl butyral derivative (PVB) is a derivative that is particularly preferably used.

Polyvinyl butyral is conventionally obtained by converting polyvinyl alcohol into polyvinyl bytyral. Polyvinyl butyral derivatives may be also used.

Examples of the polyvinyl butyral derivatives include an acid-modified PVB in which at least some of the hydroxy groups of the hydroxyethylene units are modified with an acid group such as a carboxy group, a modified PVB in which some of the hydroxy groups are modified with a (meth)acryloyl group, a modified PVB in which at least some of the hydroxy groups are modified with an amino group, a modified PVB in which at least some of the hydroxy groups have introduced thereinto ethylene glycol, propylene glycol, or a multimer thereof.

From the viewpoint of a balance being achieved between engraving sensitivity and film formation properties, the weight-average molecular weight of the polyvinyl acetal is preferably 5,000 to 800,000, more preferably 8,000 to 500,000 and, from the viewpoint of improvement of rinsing properties for engraving residue, particularly preferably 50,000 to 300,000.

Hereinafter, polyvinyl butyral (PVB) and derivatives thereof are cited for explanation as particularly preferable examples of polyvinyl acetal, but are not limited to these.

Polyvinyl butyral has a structure as shown below, and is constituted while including these structural units.

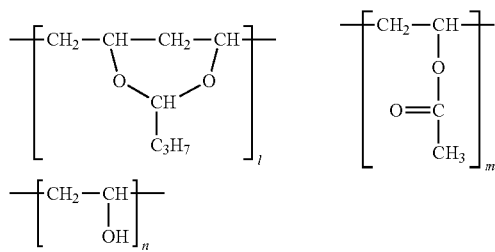

In the above formula, l, m, and n denote the content (mol %) in polyvinyl butyral of the respective repeating units and the relationship l+m+n=100 is satisfied. The butyral content in the polyvinyl butyral and the derivative thereof (value of l in the formula above) is preferably 30 to 90 mole %, more preferably 40 to 85 mole %, and particularly preferably 45 to 78 mole %.

From the viewpoint of a balance being achieved between engraving sensitivity and film formation properties, the weight-average molecular weight of the polyvinyl butyral and the derivative thereof is preferably 5,000 to 800,000, more preferably 8,000 to 500,000 and, from the viewpoint of improvement of rinsing properties for engraving residue, particularly preferably 50,000 to 300,000.

The PVB derivative is also available as a commercial product, and preferred examples thereof include, from the viewpoint of alcohol dissolving capability (particularly, ethanol), "S-REC B" series and "S-REC K (KS)" series manufactured by SEKISUI CHEMICAL CO., LTD. and "DENKA BUTYRAL" manufactured by DENKI KAGAKU KOGYO KABUSHIKI KAISHA. From the viewpoint of alcohol dissolving capability (particularly, ethanol), "S-REC B" series manufactured by SEKISUI CHEMICAL CO., LTD. and "DENKA BUTYRAL" manufactured by DENKI KAGAKU KOGYO KABUSHIKI KAISHA are more preferable. Among these, particularly preferable commercial products are shown below along with the values l, m, and n in the above formulae and the molar weight. Examples of "S-REC B" series manufactured by SEKISUI CHEMICAL CO., LTD. include "BL-1" (l=61, m=3, n=36, weight-average molecular weight: 19,000), "BL-1H" (l=67, m=3, n=30, weight-average molecular weight: 20,000), "BL-2" (l=61, m=3, n=36, weight-average molecular weight: about 27,000), "BL-5" (l=75, m=4, n=21, weight-average molecular weight: 32,000), "BL-S" (l=74, m=4, n=22, weight-average molecular weight: 23,000), "BM-S" (l=73, m=5, n=22, weight-average molecular weight: 53,000), and "BH-S" (l=73, m=5, n=22, weight-average molecular weight: 66,000), and examples of "DENKA BUTYRAL" manufactured by DENKI KAGAKU KOGYO include "#3000-1" (l=71, m=1, n=28, weight-average molecular weight: 74,000), "#3000-2" (l=71, m=1, n=28, weight-average molecular weight: 90,000), "#3000-4" (l=71, m=1, n=28, weight-average molecular weight: 117,000), "#4000-2" (l=71, m=1, n=28, weight-average molecular weight: 152,000), "#6000-C" (l=64, m=1, n=35, weight-average molecular weight: 308,000), "#6000-EP" (l=56, m=15, n=29, weight-average molecular weight: 381,000), "#6000-CS" (l=74, m=1, n=25, weight-average molecular weight: 322,000), and "#6000-AS" (l=73, m=1, n=26, weight-average molecular weight: 242,000).

When the relief-forming layer is formed using the PVB derivative as a specific polymer, a method of casting and drying a solution in which a solvent is dissolved is preferable from the viewpoint of smoothness of the film surface.

(2) An Acrylic Resin (Except a Block Copolymer)

As an acrylic resin (except a block copolymer) usable as a specific polymer, an acrylic resin may be used which can be synthesized from an acrylic monomer having a hydroxy group in the monomer.

Preferable examples of the acrylic monomer having a hydroxy group are a (meth)acrylic acid ester, a crotonic acid ester, or a (meth)acrylamide that has a hydroxy group in the molecule. Specific examples of such a monomer include 2-hydroxyethyl (meth)acrylate, 2-hydroxypropyl (meth)acrylate, and 4-hydroxybutyl (meth)acrylate.

In the present invention '(meth)acryl' means 'acryl' and/or 'methacryl' and '(meth)acrylate' means 'acrylate' and/or 'methacrylate.'

The acrylic resin may be constituted from a known acrylic comonomer other than the acrylic monomer having a hydroxy group explained above.

As the known (meth)acrylic comonomer, the (meth)acrylic monomer can be cited, and specific examples thereof include methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-hexyl (meth)acrylate, lauryl (meth)acrylate, 2-ethylhexyl (meth)acrylate, acetoxyethyl (meth)acrylate, phenyl (meth)acrylate, 2-methoxyethyl (meth)acrylate, 2-ethoxyethyl (meth)acrylate, 2-(2-methoxyethoxy)ethyl (meth)acrylate, cyclohexyl (meth)acrylate, t-butylcyclohexyl (meth)acrylate, benzyl (meth)acrylate, diethylene glycol monomethyl ether (meth)acrylate, diethylene glycol monoethyl ether (meth)acrylate, diethylene glycol monophenyl ether (meth)acrylate, triethylene glycol monomethyl ether (meth)acrylate, triethylene glycol monoethyl ether (meth)acrylate, dipropylene glycol monomethyl ether (meth)acrylate, polyethylene glycol monomethyl ether (meth)acrylate, polypropylene glycol monomethyl ether (meth)acrylate, the monomethyl ether (meth)acrylate of a copolymer of ethylene glycol and propylene glycol, N,N-dimethylaminoethyl (meth)acrylate, N,N-diethylaminoethyl (meth)acrylate, and N,N-dimethylaminopropyl (meth)acrylate.

Furthermore, a modified acrylic resin formed with a urethane group- or urea group-containing acrylic monomer may preferably be used.

Among these, from the viewpoint of aqueous ink resistance, an alkyl (meth)acrylate such as lauryl (meth)acrylate and an aliphatic cyclic structure-containing (meth)acrylate such as t-butylcyclohexyl (meth)acrylate are particularly preferable.

(3) A Novolac Resin

Furthermore, as the specific polymer, a novolac resin may be used, this being a resin formed by condensation of a phenol and an aldehyde under acidic conditions.

Preferred examples of the novolac resin include a novolac resin obtained from phenol and formaldehyde, a novolac resin obtained from m-cresol and formaldehyde, a novolac resin obtained from p-cresol and formaldehyde, a novolac resin obtained from o-cresol and formaldehyde, a novolac resin obtained from octylphenol and formaldehyde, a novolac resin obtained from mixed m-/p-cresol and formaldehyde, and a novolac resin between a mixture of phenol/cresol (any of m-, p-, o- or m-/p-, m-/o-, o-/p-mixtures) and formaldehyde.

With regard to these novolac resins, those having a weight-average molecular weight of 800 to 200,000 and a number-average molecular weight of 400 to 60,000 are preferable.

An epoxy resin having a hydroxy group in a side chain may be used as a specific polymer. A preferred example of the epoxy resin is an epoxy resin formed by polymerization, as a starting material monomer, of an adduct of bisphenol A and epichlorohydrin. The epoxy resin preferably has a weight-average molecular weight of at least 800 but no greater than 200,000, and a number-average molecular weight of at least 400 but no greater than 60,000.

Among specific polymers, polyvinyl butyral derivatives are particularly preferable from the viewpoint of rinsing properties and printing durability when the polymer is formed into the relief-forming layer.

In polymers of any embodiment described above, the content of the hydroxyl group contained in the specific polymer in the present invention is preferably 0.1 to 15 mmol/g, and more preferably 0.5 to 7 mmol/g.

The resin composition for laser engraving of the present invention may include known polymers which are not contained in the specific polymer, such as a polymer not having a hydroxyl group. Hereinafter, such a polymer is called a common polymer.

The common polymer may be selected from a polystyrene resin, polyester resin, polyamide resin, polyureapolyamide-imide resin, polyurethane resin, polysulfone resin, polyether sulfone resin, polyimide resin, polycarbonate resin, hydroxyethylene unit-containing hydrophilic polymer, acrylic resin (except block copolymer), acetal resin, epoxy resin, polycarbonate resin, rubber, thermoplastic elastomer, etc.

For example, from the viewpoint of the laser engraving sensitivity, polymers having a partial structure capable of being thermally decomposed by exposure or heating are preferable. Examples of such polymers preferably include those described in JP-A-2008-163081, paragraph 0038. Moreover, for example, when the purpose is to form a film having softness and flexibility, a soft resin or a thermoplastic elastomer is selected. It is described in detail in JP-A-2008-163081, paragraphs 0039 to 0040. Furthermore, from the viewpoint of easy preparation of the composition for the relief-forming layer, and the improvement of resistance properties for an oil-based ink in the obtained relief printing plate, the use of a hydrophilic or alcoholphilic polymer is preferable. As the hydrophilic polymer, those described in detail in JP-A-2008-163081, paragraph 0041 can be used.

Among specific polymers, polyvinyl butyral derivatives are particularly preferable from the viewpoint of rinsing properties and printing durability when the polymer is formed into the relief-forming layer.

In polymers of any embodiment described above, the content of the hydroxyl group contained in the specific polymer is preferably 0.1 to 15 mmol/g, and more preferably 0.5 to 7 mmol/g.

With regard to Component I in the resin composition for laser engraving of the present invention, one type may be used on its own, or two or more types may be used in combination.

(Component J) Solvent

The resin composition for laser engraving of the present invention may comprise (Component J) a solvent.

From the viewpoint of dissolving, a solvent used when preparing the resin composition for laser engraving of the present invention is preferably mainly an aprotic organic solvent. The aprotic organic solvent may be used on its own or may be used in combination with a protic organic solvent. More specifically, they are used preferably at aprotic organic solvent/protic organic solvent=100/0 to 50/50 (ratio by weight), more preferably 100/0 to 70/30, and particularly preferably 100/0 to 90/10.

Specific preferred examples of the aprotic organic solvent include acetonitrile, tetrahydrofuran, dioxane, toluene, propylene glycol monomethyl ether acetate, methyl ethyl ketone, acetone, methyl isobutyl ketone, ethyl acetate, butyl acetate, ethyl lactate, N,N-dimethylacetamide, N-methylpyrrolidone, and dimethyl sulfoxide.

Specific preferred examples of the protic organic solvent include methanol, ethanol, 1-propanol, 2-propanol, 1-butanol, 1-methoxy-2-propanol, ethylene glycol, diethylene glycol, and 1,3-propanediol.

<Other Additives>

The resin composition for laser engraving of the present invention may comprise as appropriate various types of known additives other than Component A to Component J as long as the effects of the present invention are not inhibited. Examples include a wax, a process oil, a metal oxide, an antiozonant, an anti-aging agent, a thermopolymerization inhibitor, and a colorant, and one type thereof may be used on its own or two or more types may be used in combination.

In the resin composition for laser engraving of the present invention, as an additive for improving engraving sensitivity, it is preferable that a nitrocellulose or highly heat-conductive material be added.

The nitrocellulose is a self-reactive compound, during laser engraving, the nitrocellulose itself generates heat to assist the thermal decomposition of the binder polymer such as a coexisting hydrophilic polymer. As a result, it is assumed that engraving sensitivity is improved.

The highly heat-conductive material is added for the purpose of assisting heat conduction, and examples of the heat-conductive material include an inorganic compound such as metal particles and an organic compound such as a conductive polymer. As the metal particles, small gold particles, small silver particles, and small copper particles having a particle size in the order of micrometers to several nanometers are preferable. As the conductive polymer, a conjugated polymer is particularly preferable, and specific examples thereof include polyaniline and polythiophene.

In addition, by using a co-sensitizer, the sensitivity when the resin composition for laser engraving is cured by light is further improved.

Further, during the production and preservation of composition, it is preferable that a small amount of thermal polymerization inhibitor be added for preventing unnecessary thermal polymerization of the polymerizable compound.

For the purpose of coloring the resin composition for laser engraving, colorant such as dye or pigment may be added. Accordingly, properties such as visibility of the image section and aptitude for an image density measuring machine can be improved.

(Relief Printing Plate Precursor for Laser Engraving)

A first embodiment of the relief printing plate precursor for laser engraving of the present invention comprises a relief-forming layer formed from the resin composition for laser engraving of the present invention.

A second embodiment of the relief printing plate precursor for laser engraving of the present invention comprises a crosslinked relief-forming layer formed by crosslinking a relief-forming layer formed from the resin composition for laser engraving of the present invention.

In the present invention, the 'relief printing plate precursor for laser engraving' means both or one of a plate having a crosslinkable relief-forming layer formed from the resin composition for laser engraving in a state before being crosslinked and a plate in a state in which it is cured by light and/or heat.

In the present invention, the 'relief-forming layer' means a layer in a state before being crosslinked, that is, a layer formed from the resin composition for laser engraving of the present invention, which may be dried as necessary.

In the present invention, the 'crosslinked relief-forming layer' means a layer formed by crosslinking the relief-forming layer. The crosslinking is preferably carried out by means of heat and/or light. Furthermore, the crosslinking is not particularly limited as long as it is a reaction by which the resin composition is cured, and it is a concept that includes a structure crosslinked due to reactions between Component B's, but it is preferable to form a crosslinked structure by a reaction between Component B and other Component.

The 'relief printing plate' is prepared by laser engraving a printing plate precursor having a crosslinked relief-forming layer.

Moreover, in the present invention, the 'relief layer' means a layer of the relief printing plate formed by engraving using a laser, that is, the crosslinked relief-forming layer after laser engraving.

A relief printing plate precursor for laser engraving of the present invention comprises a relief-forming layer formed from the resin composition for laser engraving of the present invention, which has the above-mentioned components. The (crosslinked) relief-forming layer is preferably provided above a support.

The (crosslinked) relief printing plate precursor for laser engraving may further comprise, as necessary, an adhesive layer between the support and the (crosslinked) relief-forming layer and, above the relief-forming layer, a slip coat layer and a protection film.

<Relief-Forming Layer>

The relief-forming layer is a layer formed from the resin composition for laser engraving of the present invention and is preferably a heat-crosslinkable layer.

As a mode in which a relief printing plate is prepared using the relief printing plate precursor for laser engraving, a mode in which a relief printing plate is prepared by crosslinking a relief-forming layer to thus form a relief printing plate precursor having a crosslinked relief-forming layer, and the crosslinked relief-forming layer (hard relief-forming layer) is then laser-engraved to thus form a relief layer is preferable. By crosslinking the relief-forming layer, it is possible to prevent abrasion of the relief layer during printing, and it is possible to obtain a relief printing plate having a relief layer with a sharp shape after laser engraving.

The relief-forming layer may be formed by molding the resin composition for laser engraving that has the above-mentioned components for a relief-forming layer into a sheet shape or a sleeve shape. The relief-forming layer is usually provided above a support, which is described later, but it may be formed directly on the surface of a member such as a cylinder of equipment for plate making or printing or may be placed and immobilized thereon, and a support is not always required.

A case in which the relief-forming layer is mainly formed in a sheet shape is explained as an example below.

<Support>

A material used for the support of the relief printing plate precursor for laser engraving is not particularly limited, but one having high dimensional stability is preferably used, and examples thereof include metals such as steel, stainless steel, or aluminum, plastic resins such as a polyester (e.g. PET (polyethylene terephthalate), PBT (polybutylene terephthalate), or PAN (polyacrylonitrile)) or polyvinyl chloride, synthetic rubbers such as styrene-butadiene rubber, and glass fiber-reinforced plastic resins (epoxy resin, phenolic resin, etc.). As the support, a PET film or a steel substrate is preferably used. The configuration of the support depends on whether the relief-forming layer is in a sheet shape or a sleeve shape.

<Adhesive Layer>

An adhesive layer may be provided between the relief-forming layer and the support for the purpose of strengthening the adhesion between the two layers. Examples of materials (adhesives) that can be used in the adhesive layer include those described in 'Handbook of Adhesives', Second Edition, Ed by I. Skeist, (1977).

<Protection Film, Slip Coat Layer>

For the purpose of preventing scratches or dents in the relief-forming layer surface or the crosslinked relief-forming layer surface, a protection film may be provided on the relief-forming layer surface or the crosslinked relief-forming layer surface. The thickness of the protection film is preferably 25 to 500 μm, and more preferably 50 to 200 μm. The protection film may employ, for example, a polyester-based film such as PET or a polyolefin-based film such as PE (polyethylene) or PP (polypropylene). The surface of the film may be made matte. The protection film is preferably peelable.

When the protection film is not peelable or conversely has poor adhesion to the relief-forming layer, a slip coat layer may be provided between the two layers. The material used in the slip coat layer preferably employs as a main component a resin that is soluble or dispersible in water and has little tackiness, such as polyvinyl alcohol, polyvinyl acetate, partially saponified polyvinyl alcohol, a hydroxyalkylcellulose, an alkylcellulose, or a polyamide resin.

(Process for Producing Relief Printing Plate Precursor for Laser Engraving)

Formation of a relief-forming layer in the relief printing plate precursor for laser engraving is not particularly limited, and examples thereof include a method in which the resin composition for laser engraving is prepared, solvent is removed as necessary from this resin composition for laser engraving, and it is melt-extruded onto a support. Alternatively, a method may be employed in which the resin composition for laser engraving is cast onto a support, and this is dried in an oven to thus remove solvent from the resin composition.

Among them, the process for making a relief printing plate for laser engraving of the present invention is preferably a production process comprising a layer formation step of forming a relief-forming layer from the resin composition for laser engraving of the present invention and a crosslinking step of crosslinking the relief-forming layer by means of heat and/or light to thus obtain a relief printing plate precursor having a crosslinked relief-forming layer.

Subsequently, as necessary, a protection film may be laminated on the relief-forming layer. Laminating may be carried out by compression-bonding the protection film and the relief-forming layer by means of heated calendar rollers, etc. or putting a protection film into intimate contact with a relief-forming layer whose surface is impregnated with a small amount of solvent.

When a protection film is used, a method in which a relief-forming layer is first layered on a protection film and a support is then laminated may be employed.

When an adhesive layer is provided, it may be dealt with by use of a support coated with an adhesive layer. When a slip coat layer is provided, it may be dealt with by use of a protection film coated with a slip coat layer.

<Layer Formation Step>

The process for making the relief printing plate precursor for laser engraving of the present invention preferably comprises a layer formation step of forming a relief-forming layer from the resin composition for laser engraving of the present invention.

Preferred examples of a method for forming a relief-forming layer include a method in which the resin composition for laser engraving of the present invention is prepared, solvent is removed as necessary from this resin composition for laser engraving, and it is then melt-extruded onto a support and a method in which the resin composition for laser engraving of the present invention is prepared, the resin composition for laser engraving of the present invention is cast onto a support, and this is dried in an oven to thus remove the solvent.

The resin composition for laser engraving may be produced by, for example, dissolving Component A, and as optional components Component B to Component F in an appropriate solvent. Since it is necessary to remove most of the solvent component in a stage of producing a relief printing plate precursor, it is preferable to use as the solvent a volatile low-molecular-weight alcohol (e.g. methanol, ethanol, n-propanol, isopropanol, propylene glycol monomethyl ether), etc., and adjust the temperature, etc. to thus reduce as much as possible the total amount of solvent to be added.

The thickness of the (crosslinked) relief-forming layer in the relief printing plate precursor for laser engraving before and after crosslinking is preferably at least 0.05 mm but no greater than 10 mm, more preferably at least 0.05 mm but no greater than 7 mm, and yet more preferably at least 0.05 mm but no greater than 3 mm.

<Crosslinking Step>

The process for producing a relief printing plate precursor for laser engraving of the present invention is preferably a production process comprising a crosslinking step of crosslinking the relief-forming layer by means of light and/or heat to thus obtain a relief printing plate precursor having a crosslinked relief-forming layer, and more preferably a production process comprising a crosslinking step of crosslinking the relief-forming layer by heat.

The relief-forming layer may be crosslinked by heating the relief printing plate precursor for laser engraving (step of crosslinking by means of heat). As heating means, there can be cited a method in which a printing plate precursor is heated in a hot air oven or a far-infrared oven for a predetermined period of time and a method in which it is put into contact with a heated roller for a predetermined period of time.

Due to the relief-forming layer being crosslinked, firstly, a relief formed after laser engraving becomes sharp and, secondly, tackiness of engraving residue formed when laser engraving is suppressed.

In addition, since by using a photopolymerization initiator or the like, the polymerizable compound is polymerized to form a crosslink, the crosslinking may be further carried out by means of light.

When the relief-forming layer comprises a photopolymerization initiator, the relief-forming layer may be crosslinked by irradiating the relief-forming layer with actinic radiation that triggers the photopolymerization initiator.

It is preferable to apply light to the entire surface of the relief-forming layer. Examples of the light (also called 'actinic radiation') include visible light, UV light, and an electron beam, but UV light is most preferably used. When the side where there is a substrate, such as a relief-forming layer support, for fixing the relief-forming layer, is defined as the reverse face, only the front face need be irradiated with light, but when the support is a transparent film through which actinic radiation passes, it is preferable to further irradiate the reverse face with light as well. When a protection film is present, irradiation from the front face may be carried out with the protection film as it is or after peeling off the protection film. Since there is a possibility of polymerization being inhibited in the presence of oxygen, irradiation with actinic radiation may be carried out after superimposing a polyvinyl chloride sheet on the relief-forming layer and evacuating.

(Relief Printing Plate and Process for Making Same)

The process for making a relief printing plate of the present invention comprises a layer formation step of forming a relief-forming layer from the resin composition for laser engraving of the present invention, a crosslinking step of crosslinking the relief-forming layer by means of heat and/or light to thus obtain a relief printing plate precursor having a crosslinked relief-forming layer, and an engraving step of laser-engraving the relief printing plate precursor having the crosslinked relief-forming layer.

The relief printing plate of the present invention is a relief printing plate having a relief layer obtained by crosslinking and laser-engraving a layer formed from the resin composition for laser engraving of the present invention, and is preferably a relief printing plate made by the process for making a relief printing plate of the present invention.

The relief printing plate of the present invention is preferably used when an aqueous ink is printed.

The layer formation step and the crosslinking step in the process for making a relief printing plate of the present invention mean the same as the layer formation step and the crosslinking step in the above-mentioned process for producing a relief printing plate precursor for laser engraving, and preferred ranges are also the same.

<Engraving Step>

The process for making a relief printing plate of the present invention preferably comprises an engraving step of laser-engraving the relief printing plate precursor having a crosslinked relief-forming layer.

The engraving step is a step of laser-engraving a crosslinked relief-forming layer that has been crosslinked in the crosslinking step to thus form a relief layer. Specifically, it is preferable to engrave a crosslinked relief-forming layer that has been crosslinked by irradiation with laser light according to a desired image, thus forming a relief layer. Furthermore, a step in which a crosslinked relief-forming layer is subjected to scanning irradiation by controlling a laser head using a computer in accordance with digital data of a desired image can preferably be cited.

This engraving step preferably employs an infrared laser. When irradiated with an infrared laser, molecules in the crosslinked relief-forming layer undergo molecular vibration, thus generating heat. When a high power laser such as a carbon dioxide laser or a YAG laser is used as the infrared laser, a large quantity of heat is generated in the laser-irradiated area, and molecules in the crosslinked relief-forming layer undergo molecular scission or ionization, thus being selectively removed, that is, engraved. The advantage of laser engraving is that, since the depth of engraving can be set freely, it is possible to control the structure three-dimensionally. For example, for an area where fine halftone dots are printed, carrying out engraving shallowly or with a shoulder prevents the relief from collapsing due to printing pressure, and for a groove area where a fine outline character is printed, carrying out engraving deeply makes it difficult for ink the groove to be blocked with ink, thus enabling breakup of an outline character to be suppressed.

In particular, when engraving is carried out using an infrared laser that corresponds to the absorption wavelength of the photothermal conversion agent, it becomes possible to selectively remove the crosslinked relief-forming layer at higher sensitivity, thus giving a relief layer having a sharp image.

As the infrared laser used in the engraving step, from the viewpoint of productivity, cost, etc., a carbon dioxide laser (a $CO_2$ laser) or a semiconductor laser is preferable. In particular, a fiber-coupled semiconductor infrared laser (FC-LD) is preferably used. In general, compared with a $CO_2$ laser, a semiconductor laser has higher efficiency laser oscillation, is less expensive, and can be made smaller. Furthermore, it is easy to form an array due to the small size. Moreover, the shape of the beam can be controlled by treatment of the fiber.

With regard to the semiconductor laser, one having a wavelength of 700 to 1,300 nm is preferable, one having a wavelength of 800 to 1,200 nm is more preferable, one having a wavelength of 860 to 1,200 nm is further preferable, and one having a wavelength of 900 to 1,100 nm is particularly preferable.

Furthermore, the fiber-coupled semiconductor laser can output laser light efficiently by being equipped with optical fiber, and this is effective in the engraving step in the present invention. Moreover, the shape of the beam can be controlled by treatment of the fiber. For example, the beam profile may be a top hat shape, and energy can be applied stably to the plate face. Details of semiconductor lasers are described in 'Laser Handbook $2^{nd}$ Edition' The Laser Society of Japan, and 'Applied Laser Technology' The Institute of Electronics and Communication Engineers, etc.

Moreover, as plate making equipment comprising a fiber-coupled semiconductor laser that can be used suitably in the process for making a relief printing plate employing the relief printing plate precursor of the present invention, those described in detail in JP-A-2009-172658 and JP-A-2009-214334 can be cited.

The process for making a relief printing plate of the present invention may as necessary further comprise, subsequent to the engraving step, a rinsing step, a drying step, and/or a post-crosslinking step, which are shown below.

Rinsing step: a step of rinsing the engraved surface by rinsing the engraved relief layer surface with water or a liquid containing water as a main component.

Drying step: a step of drying the engraved relief layer.

Post-crosslinking step: a step of further crosslinking the relief layer by applying energy to the engraved relief layer.

After the above steps, a rinsing step of washing off engraving residue by rinsing the engraved surface with water or a liquid containing water as a main component may be added. Examples of rinsing means include a method in which washing is carried out with tap water, a method in which high pressure water is spray-jetted, and a method in which the engraved surface is brushed in the presence of mainly water using a batch or conveyor brush type washout machine known as a photosensitive resin relief printing plate precursor, and when slime due to engraving residue cannot be eliminated, a rinsing liquid to which a soap or a surfactant is added may be used.

When the rinsing step of rinsing the engraved surface is carried out, it is preferable to add a drying step of drying an engraved relief-forming layer so as to evaporate rinsing liquid.

Furthermore, as necessary, a post-crosslinking step for further crosslinking the relief-forming layer may be added. By carrying out a post-crosslinking step, which is an additional crosslinking step, it is possible to further strengthen the relief formed by engraving.

The pH of the rinsing liquid that can be used in the present invention is preferably at least 9, more preferably at least 10, and yet more preferably at least 11. The pH of the rinsing liquid is preferably no greater than 14, more preferably no greater than 13.5, yet more preferably no greater than 13.2, particularly preferably no greater than 13, and most preferably no greater than 12.5. When in the above-mentioned range, handling is easy.

In order to set the pH of the rinsing liquid in the above-mentioned range, the pH may be adjusted using an acid and/or a base as appropriate, and the acid or base used is not particularly limited.

The rinsing liquid that can be used in the present invention preferably comprises water as a main component.

The rinsing liquid may contain as a solvent other than water a water-miscible solvent such as an alcohol, acetone, or tetrahydrofuran.

The rinsing liquid preferably comprises a surfactant.

From the viewpoint of removability of engraving residue and little influence on a relief printing plate, preferred examples of the surfactant that can be used in the present invention include betaine compounds (amphoteric surfactants) such as a carboxybetaine compound, a sulfobetaine compound, a phosphobetaine compound, an amine oxide compound, and a phosphine oxide compound.

Furthermore, examples of the surfactant also include known anionic surfactants, cationic surfactants, amphoteric surfactants, and nonionic surfactants. Moreover, a fluorine-based or silicone-based nonionic surfactant may also be used in the same manner.

With regard to the surfactant, one type may be used on its own or two or more types may be used in combination.

It is not necessary to particularly limit the amount of surfactant used, but it is preferably 0.01 to 20 wt % relative to the total weight of the rinsing liquid, and more preferably 0.05 to 10 wt %.

The relief printing plate of the present invention having a relief layer on the surface of any substrate such as a support etc. may be produced as described above.

From the viewpoint of satisfying suitability for various aspects of printing, such as abrasion resistance and ink transfer properties, the thickness of the relief layer of the relief printing plate is preferably at least 0.05 mm but no greater than 10 mm, more preferably at least 0.05 mm but no greater than 7 mm, and yet more preferably at least 0.05 mm but no greater than 3 mm.

Furthermore, the Shore A hardness of the relief layer of the relief printing plate is preferably at least 50° but no greater than 90°. When the Shore A hardness of the relief layer is at least 50°, even if fine halftone dots formed by engraving receive a strong printing pressure from a letterpress printer, they do not collapse and close up, and normal printing can be carried out. Furthermore, when the Shore A hardness of the relief layer is no greater than 90°, even for flexographic printing with kiss touch printing pressure it is possible to prevent patchy printing in a solid printed part.

The Shore A hardness in the present specification is a value measured at 25° C. by a durometer (a spring type rubber hardness meter) that presses an indenter (called a pressing needle or indenter) into the surface of a measurement target so as to deform it, measures the amount of deformation (indentation depth), and converts it into a numerical value.

The relief printing plate of the present invention is particularly suitable for printing by a flexographic printer using an aqueous ink, but printing is also possible when it is carried out by a relief printer using any of aqueous, oil-based, and UV inks, and printing is also possible when it is carried out by a flexographic printer using a UV ink. The relief printing plate of the present invention has excellent rinsing properties, there is no engraving residue, since a relief layer obtained has excellent elasticity aqueous ink transfer properties and printing durability are excellent, and printing can be carried out for a long period of time without plastic deformation of the relief layer or degradation of printing durability.

According to the resin composition for laser engraving of the present invention, it is possible to obtain the relief printing plate having excellent printing durability, and to provide a resin composition for laser engraving having excellent engraving sensitivity, a relief printing plate precursor using the resin composition for the laser engraving, a process for producing a relief printing plate using the relief printing plate precursor, and a relief printing plate obtained by the process of producing the same.

EXAMPLES

Hereinafter, the present invention will be described in further detail with reference to Examples, but the present invention is not limited to Examples.

Here, weight-average molecular weights (Mw) of polymers in Examples indicate values measured by gel permeation chromatography (GPC) (eluent: tetrahydrofuran) unless specified otherwise.

Here, the details of Component A to Component C used in each of Examples and Comparative Examples are as follows. Here, "b" described below indicates a bonded part of each block in a block copolymer.

A-1: LA POLYMER (manufactured by Kuraray Co., Ltd.), trade name: LA2140e, block copolymer of poly(methyl methacrylate)-b-poly-(n-butyl acrylate)-b-poly(methyl methacrylate) (poly(methyl methacrylate):poly-(n-butyl acrylate)=22:78 (weight ratio)), Mw=79,000 (GPC, eluent: tetrahydrofuran)

A-2: LA POLYMER (manufactured by Kuraray Co., Ltd.), trade name: LA2250, block copolymer of poly(methyl methacrylate)-b-poly(n-butyl acrylate)-b-poly(methyl methacrylate) (poly(methyl methacrylate):poly(n-butyl acrylate)=32:68 (weight ratio)), Mw=68,000 (GPC, eluent: tetrahydrofuran)

A-3: LA POLYMER (manufactured by Kuraray Co., Ltd.), trade name: LA4285, block copolymer of poly(methyl methacrylate)-b-poly(n-butyl acrylate)-b-poly(methyl methacrylate) (poly(methyl methacrylate):poly(n-butyl acrylate)=50:50 (weight ratio)), Mw=67,000 (GPC, eluent: tetrahydrofuran))

A-4: block copolymer of poly(methyl methacrylate)-b-poly(n-butyl methacrylate)-b-poly(methyl methacrylate) with 30:40:30 (weight %), Mw=120,000 (GPC, eluent: tetrahydrofuran)

A-5: block copolymer of poly(methyl methacrylate)-b-poly(acrylic acid)-b-poly(methyl methacrylate) with 30:40:30 (weight %), Mw=100,000 (GPC, eluent: tetrahydrofuran)

A-6: block copolymer of poly(ethyl methacrylate)-b-poly(2-hydroxyethyl methacrylate)-b-poly(ethyl methacrylate) with 40:40:20 (weight %), Mw=100,000 (GPC, eluent: tetrahydrofuran)

A-7: block copolymer of poly(benzyl methacrylate)-b-poly(isobutyl methacrylate) with 30:70 (weight %), Mw=80,000 (GPC, eluent: tetrahydrofuran)

A-8: block copolymer of poly(cyclohexyl methacrylate)-b-poly(ethylene glycol monomethyl ether methacrylate)-b-poly(cyclohexyl methacrylate) with 50:25:25 (weight %), Mw=150,000 (GPC, eluent: tetrahydrofuran)

A-9: block copolymer of poly(t-butyl methacrylate)-b-poly(propylene glycol monomethyl ether methacrylate)-b-poly(t-butyl methacrylate) with 30:40:30 (weight %), Mw=140,000 (GPC, eluent: tetrahydrofuran)

A-10: block copolymer of poly(methyl methacrylate)-b-poly(n-hexyl methacrylate)-b-poly(methyl methacrylate) with 30:30:40 (weight %), Mw=50,000 (GPC, eluent: tetrahydrofuran)

A-11: random copolymer of methyl methacrylate (60 weight %) and n-butyl methacrylate (40 weight %), Mw=120,000 (GPC, eluent: tetrahydrofuran)

TR2000: manufactured by JSR CORPORATION, block copolymer of styrene-butadiene

KRATON G1780: manufactured by Kraton Performance Polymers Inc., block copolymer of styrene-isoprene-styrene A bridged system (system in which a compound having a hydrolyzable silyl group and/or a silanol group is used) is used as follows.

S-1: crosslinking agent: KBE-846 (bis(triethoxysilyl)propyl)tetrasulfide, manufactured by Shin-Etsu Chemical Co., Ltd.) and crosslinking catalyst: phosphoric acid (manufactured by Wako Pure Chemical Industries, Ltd.)

S-2: crosslinking agent: Compound B-1 below, crosslinking catalyst: hexamethylene tetramine (manufactured by Wako Pure Chemical Industries, Ltd.)

S-3: crosslinking agent: X-12-965 (tris(3-(trimethoxysilyl)propyl)isocyanurate, manufactured by Shin-Etsu Chemical Co., Ltd.) and crosslinking catalyst: 1,8-diazabicyclo[5.4.0]undec-7-ene (manufactured by Tokyo Chemical Industry Co., Ltd.)

S-4: crosslinking agent: KBE-660P (compound below, manufactured by Shin-Etsu Chemical Co., Ltd.) and crosslinking catalyst: 1,8-diazabicyclo[5.4.0]undec-7-ene (manufactured by Tokyo Chemical Industry Co., Ltd.)

S-5: crosslinking agent: KBM-503 (3-methacryloxypropyltriethoxysilane, manufactured by Shin-Etsu Chemical Co., Ltd.), crosslinking catalyst: 1,8-diazabicyclo[5.4.0]undec-7-ene (manufactured by Tokyo Chemical Industry Co., Ltd.), and Perbutyl Z (manufactured by NOF CORPORATION, t-butyl peroxybenzoate)

S-6: crosslinking agent: Compound B-2 below and crosslinking catalyst: 1,8-diazabicyclo[5.4.0]undec-7-ene (manufactured by Tokyo Chemical Industry Co., Ltd.)

S-7: crosslinking agent: Compound B-3 below and crosslinking catalyst: 1,8-diazabicyclo[5.4.0]undec-7-ene (manufactured by Tokyo Chemical Industry Co., Ltd.)

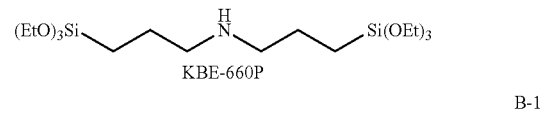

KBE-660P

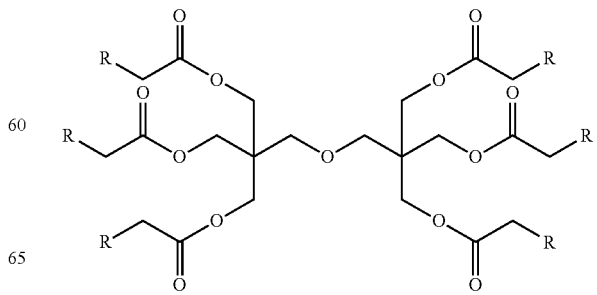

B-1

-continued

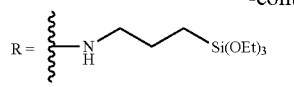

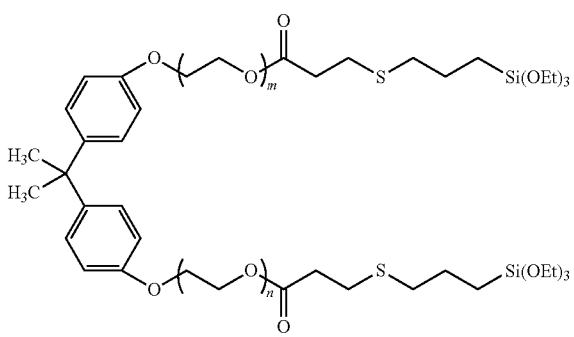

m + n = 4

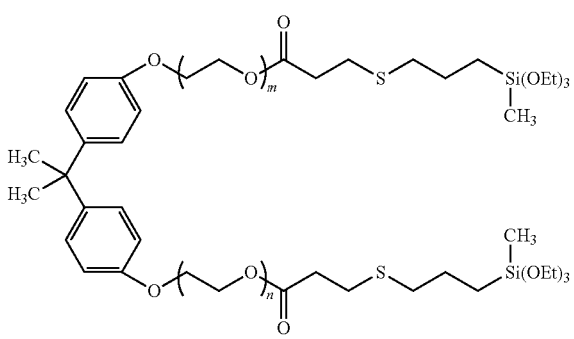

m + n = 10

Et in the chemical formulae above is an ethyl group, and Me is a methyl group.

A bridged system (polyfunctional ethylenically unsaturated compound) is used as follows.

S-8: crosslinking agent: diethylene glycol dimethacrylate and polymerization initiator: V-601 (manufactured by Wako Pure Chemical Industries, Ltd., dimethyl 2,2'-azobis(2-methylpropionate))

S-9: crosslinking agent: DPHA (dipentaerythritol hexaacrylate (manufactured by The Nippon Synthetic Chemical Industry Co., Ltd.) and polymerization initiator: Perbutyl Z (manufactured by NOF CORPORATION, t-butyl peroxybenzoate)

S-10: crosslinking agent: DCP (tricyclodecane dimethanol dimethacrylate) and polymerization initiator: Perbutyl Z (manufactured by NOF CORPORATION, t-butyl peroxybenzoate)

S-11: crosslinking agent: V#295 (trimethylol propane triacrylate) (manufactured by OSAKA ORGANIC CHEMICAL INDUSTRY LTD.) and polymerization initiator: Perbutyl Z (manufactured by NOF CORPORATION, t-butyl peroxybenzoate)

S-12: crosslinking agent: V#400 (pentaerythritol tetraacrylate) (manufactured by OSAKA ORGANIC CHEMICAL INDUSTRY LTD.) and polymerization initiator: Percumyl D (manufactured by NOF CORPORATION, dicumyl peroxide)

S-13: crosslinking agent: 1,6-hexanediol diacrylate and lauryl methacrylate were used with a weight ratio of 3:1 and polymerization initiator: Perbutyl Z (manufactured by NOF CORPORATION, t-butyl peroxybenzoate)

A bridged system (a compound having two or more cyclic structures selected from a group consisting of an epoxy ring, an oxetane ring and a 5-membered carbonate ring) is used as follows.

S-14: crosslinking agent: Compound B-4 below/Compound B-6 below (were used with a weight ratio of 46/21) and crosslinking catalyst: 1,8-diazabicyclo[5.4.0]undec-7-ene (manufactured by Tokyo Chemical Industry Co., Ltd.)

S-15: crosslinking agent: Compound B-4 below/Compound B-7 below (were used with a weight ratio of 46/21) and crosslinking catalyst: 1,8-diazabicyclo[5.4.0]undec-7-ene (manufactured by Tokyo Chemical Industry Co., Ltd.)

S-16: crosslinking agent: Compound B-5 below/Compound B-6 below (were used with a weight ratio of 46/21) and crosslinking catalyst: 2-ethyl-4-methylimidazole (manufactured by Tokyo Chemical Industry Co., Ltd.)

S-17: crosslinking agent: Compound B-4 below/Compound B-8 below (were used with a weight ratio of 46/21) and crosslinking catalyst: triphenylphosphine

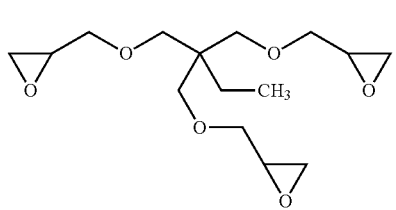

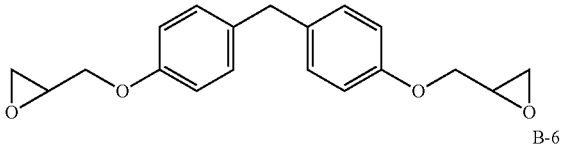

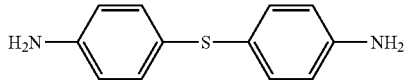

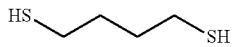

IRGACURE184: IRGACURE184 (photopolymerization initiator, 1-hydroxycyclohexyl phenyl ketone, manufactured by Nihon Ciba-Geigy K.K.)

V-601: dimethyl 2,2'-azobis(2-methylpropionate) (photopolymerization initiator, manufactured by Wako Pure Chemical Industries, Ltd.)

Carbon black: Ketjenblack EC600 JD (photothermal conversion agent, manufactured by Lion Corporation)

Tributyl citrate (plasticizer, manufactured by KUROGANE KASEI Co., Ltd.)

2-butoxyethyl adipate (plasticizer, manufactured by ADEKA CORPORATION)

Liquid polybutadiene: Poly bd (plasticizer, manufactured by Idemitsu Kosan Co., Ltd.)

Cresyl diphenyl phosphate (plasticizer, manufactured by Tokyo Chemical Industry Co., Ltd.)

Isobornyl acetate (fragrance, manufactured by Wako Pure Chemical Industries, Ltd.)

AEROSIL 200CF: silica particle (filler, manufactured by Nippon Aerosil Co., Ltd.)

Sylosphere C-1504: spherical porous silica (filler, manufactured by FUJI SILYCIA CHEMICAL LTD.)
EXPANCEL: Thermally expandable microcapsule (filler, manufactured by Akzo Noble)

Examples 1 to 36 and Comparative Examples 1 to 4

1. Preparation of Resin Composition for Laser Engraving

In a three-neck flask equipped with a mixing impeller and a condenser, 50 parts by weight of Compound A shown in Table 1, 10 parts by weight of plasticizer shown in Table 1, and 47 parts by weight of propylene glycol monomethyl ether acetate were added as a solvent, followed by stirring at 70° C. for 180 minutes to dissolve Compound A.

Thereafter, the temperature of the solution was set to 40° C. and 1 part by weight of photothermal conversion agent shown in Table 1 and 5 parts by weight of filler shown in Table 1 were added, followed by stirring for 30 minutes.

Thereafter, 23 parts by weight of Compound B shown in Table 1, 0.4 parts by weight of Compound C shown in Table 1, and 0.1 parts by weight of fragrance shown in Table 1 (relative to the total solid content of resin composition) were added, followed by stirring at 40° C. for 10 minutes.

With this operation, various fluent coating solutions for a crosslinkable relief-forming layer (resin compositions for laser engraving) were obtained. Here, "None" shown in Table 1 indicates that the corresponding component was not added above.

In addition, in Example 20, instead of V-601 of S-8, IRGACURE 184 was added, and in Example 21, an amount of V-601 added was changed to 1 part by weight. Further, in Example 29, instead of V-601 of S-8, 3 parts by weight of IRGACURE 184 was added.

TABLE 1

|  | Acrylic block copolymer | Bridged system | Photothermal conversion agent | Plasticizer | Other additives |
|---|---|---|---|---|---|
| Example 1 | A-1 | None | None | None | None |
| Example 2 | A-1 | S-1 | Carbon black | None | None |
| Example 3 | A-2 | S-1 | Carbon black | None | None |
| Example 4 | A-3 | S-1 | Carbon black | None | None |
| Example 5 | A-4 | S-1 | Carbon black | None | None |
| Example 6 | A-5 | S-1 | Carbon black | Tributyl citrate | None |
| Example 7 | A-6 | S-12 | Carbon black | Tributyl citrate | None |
| Example 8 | A-7 | S-12 | Carbon black | Tributyl citrate | None |
| Example 9 | A-8 | S-12 | Carbon black | Tributyl citrate | None |
| Example 10 | A-9 | S-12 | Carbon black | Tributyl citrate | None |
| Example 11 | A-10 | S-12 | Carbon black | Tributyl citrate | None |
| Example 12 | A-1 | S-1 | Carbon black | None | Isobornyl acetate |
| Example 13 | A-1 | S-2 | Carbon black | None | Isobornyl acetate |
| Example 14 | A-1 | S-3 | Carbon black | None | Isobornyl acetate |
| Example 15 | A-1 | S-4 | Carbon black | None | Isobornyl acetate |
| Example 16 | A-1 | S-5 | Carbon black | None | Isobornyl acetate |
| Example 17 | A-1 | S-6 | Carbon black | None | Isobornyl acetate |
| Example 18 | A-1 | S-7 | Carbon black | None | Isobornyl acetate |
| Example 19 | A-1 | S-8 | Carbon black | None | Isobornyl acetate |
| Example 20 | A-1 | S-8 + IRGACURE18 | Carbon black | None | Isobornyl acetate |
| Example 21 | A-1 | S-8 + V-601 | Carbon black | None | Isobornyl acetate |
| Example 22 | A-1 | S-8 | None | None | Isobornyl acetate |
| Example 23 | A-1 | S-9 | Carbon black | None | Isobornyl acetate |
| Example 24 | A-1 | S-10 | Carbon black | (2-butoxyethyl) | Isobornyl acetate |
| Example 25 | A-1 | S-10 | Carbon black | Liquid polybutadiene | Isobornyl acetate |
| Example 26 | A-1 | S-11 | Carbon black | (2-butoxyethyl) | Isobornyl acetate |
| Example 27 | A-1 | S-12 | Carbon black | (2-butoxyethyl) | Isobornyl acetate |
| Example 28 | A-1 | S-13 | Carbon black | (2-butoxyethyl) | Isobornyl acetate |
| Example 29 | A-1 | S-13 + IRGACURE18 | None (photo crosslinking) | (2-butoxyethyl) adipate | Isobornyl acetate |
| Example 30 | A-2 | S-14 | Carbon black | (2-butoxyethyl) | Isobornyl acetate |
| Example 31 | A-2 | S-15 | Carbon black | (2-butoxyethyl) | Isobornyl acetate |
| Example 32 | A-2 | S-16 | Carbon black | (2-butoxyethyl) | Isobornyl acetate |
| Example 33 | A-2 | S-17 | Carbon black | (2-butoxyethyl) | Isobornyl acetate |
| Example 34 | A-3 | S-1 | Carbon black | Cresyl diphenyl phosphate | AEROSIL 200CF |
| Example 35 | A-3 | S-13 | Carbon black | Cresyl diphenyl phosphate | Sylosphere C-1504 |
| Example 36 | A-3 | S-14 | Carbon black | Cresyl diphenyl phosphate | EXPANCEL |
| Comparative Example 1 | TR2000 | S-1 | Carbon black | None | None |
| Comparative Example 2 | KRATON G1780 | S-14 | Carbon black | (2-butoxyethyl) adipate | Isobornyl acetate |
| Comparative Example 3 | KRATON G1780 | S-13 + IRGACURE18 | None (photo crosslinking) | (2-butoxyethyl) adipate | Isobornyl acetate |
| Comparative Example 4 | A-11 | S-12 | Carbon black | (2-butoxyethyl) adipate | Isobornyl acetate |

2. Production of Relief Printing Plate Precursor for Laser Engraving

A spacer (frame) having a predetermined thickness was provided on a PET substrate and each resin composition for laser engraving obtained by above Examples 1 to 36 and Comparative Examples 1 to 4 was steadily cast so as not to flow out of the spacer (frame), followed by drying at 70° C. for 3 hours in an oven and providing an approximately 1 mm-thick relief-forming layer to produce the relief printing plate precursor for laser engraving.

3. Production of Relief Printing Plate

Each of the obtained relief-forming layers of precursor was heated at 80° C. for 3 hours and further heated at 100° C. for 3 hours to thermally crosslink the relief-forming layer.

The relief-forming layer after being crosslinked was engraved by two types of lasers below.

As a carbon dioxide laser engraving machine for engraving by laser irradiation, High-grade $CO_2$ laser marker ML-9100 series (manufactured by KEYENCE CORPORATION) was used. After eliminating a protective film from a printing plate precursor 1 for laser engraving, 1 cm square of solid part was raster-engraved under the conditions of output: 12 W, head speed: 200 mm/sec, and pitch setting: 2,400 DPI.

As a semiconductor laser engraving machine, a laser recording apparatus equipped with a fiber-coupled semiconductor laser (FC-LD) SDL-6390 (manufactured by JDS Uniphase Corporation, wavelength: 915 nm) having a maximum output of 8.0 W was used. Using the semiconductor laser engraving machine, 1 cm square of solid part was raster-engraved under the conditions of laser output: 7.5 W, head speed: 409 mm/sec, and pitch setting: 2,400 DPI.

The thickness of relief layer having each of the relief printing plate in Examples 1 to 36 and Comparative Examples 1 to 4 obtained above was approximately 1 mm.

The Shore A hardness of the relief layer at 25° C. was 75° when being measured in the above-described measurement method.

4. Evaluation of Relief Printing Plate

Performance of the relief printing plate was evaluated according to items below, and the results are shown in Table 2.

(4-1) Engraving Depth

"Engraving Depth" of the relief layer which is obtained by laser engraving the relief-forming layer of the relief printing plate precursor obtained in Examples and Comparative Examples was measured as follows. Here, "engraving depth" indicates the difference between the engraved position (height) and the non-engraved position (height) in a case where the cross-section of the relief layer is observed. "Engraving depths" in the present examples were measured by observation using an ultra-depth color 3D profile measurement microscope VK9510 (manufactured by Keyence Corporation). The large engraving depth means a high engraving sensitivity. The results are shown in Table 2 for each type of laser used for engraving.

(4-2) Rinsing Property

The plate laser-engraved by the $CO_2$ laser was immersed into water and the engraved part was rubbed 10 times with a toothbrush (manufactured by Lion Corporation, clinical toothbrush, flat). Thereafter, whether residue remained in the surface of the relief layer using an optical microscope was checked. No residue was rated as "excellent", almost no residue was rated as "good", a small amount of residue was rated as "good~fair", a case where a residue remained but caused no problem in practice was rated as "fair", and a case where a residue was not removed was rated as "poor".

(4-3) Printing Durability

The relief printing plate obtained by laser engraving using the $CO_2$ laser was set in a printing machine (ITM-4 type, manufactured by IYO KIKAI SEISAKUSHO Co., Ltd.), and printing was continuously performed using an aqueous ink AQUA SPZ 16 RED (manufactured by TOYO INK CO., LTD.) as an ink without dilution and using FULL COLOR FORM M70 (manufactured by Nippon Paper Group, thickness 100 μm) as a printing paper to check a highlight from 1 to 10% on the printed matter. The time when unprinted halftone dots occurred was regarded as completion of printing, and the length (meters) of paper that had been printed until the completion of printing was taken as the index. A larger value of this index was evaluated to have excellent printing durability.

(4-4) Ink Transferability

During the evaluation of printing durability, the degree of adherence of ink at the solid part on a printed matter at a paper length of 1000 m from the initiation of printing were compared by visual inspection.

The evaluation criteria were that a printed matter having uniform density and slight gloss (the index of gloss means that an ink is reliably transferred to a certain thickness (amount)) without unevenness was rated as "excellent", a printed matter having uniform density without unevenness was rated as "good", a printed matter having unevenness was rated as "poor", and a printed matter in an intermediate state between "good" and "poor" was rated as "fair."

TABLE 2

| | Ink Rinsing Property | Ink Transferability | Printing Durability (m) | Engraving Depth (μm) $CO_2$ laser | Engraving Depth (μm) IR laser (FC-LD) |
|---|---|---|---|---|---|
| Example 1 | Fair | Fair | 180,000 | 320 | 0 |
| Example 2 | Excellent | Fair | 240,000 | 350 | 420 |
| Example 3 | Excellent | Fair | 240,000 | 355 | 426 |
| Example 4 | Excellent | Fair | 240,000 | 360 | 432 |
| Example 5 | Excellent | Fair | 220,000 | 350 | 420 |
| Example 6 | Excellent | Good | 250,000 | 335 | 402 |
| Example 7 | Good | Good | 240,000 | 345 | 414 |
| Example 8 | Good | Good | 230,000 | 355 | 426 |
| Example 9 | Good | Good | 250,000 | 360 | 432 |
| Example 10 | Good | Good | 250,000 | 350 | 420 |
| Example 11 | Good | Good | 260,000 | 350 | 420 |
| Example 12 | Excellent | Fair | 240,000 | 350 | 420 |
| Example 13 | Excellent | Good | 210,000 | 360 | 432 |
| Example 14 | Excellent | Good | 230,000 | 340 | 408 |
| Example 15 | Excellent | Good | 230,000 | 330 | 396 |
| Example 16 | Excellent | Good | 250,000 | 350 | 420 |
| Example 17 | Excellent | Good | 250,000 | 360 | 432 |
| Example 18 | Excellent | Good | 260,000 | 340 | 408 |
| Example 19 | Good | Excellent | 280,000 | 370 | 444 |
| Example 20 | Good | Good | 240,000 | 370 | 444 |
| Example 21 | Good | Good | 240,000 | 370 | 444 |
| Example 22 | Good | Good | 240,000 | 330 | 0 |
| Example 23 | Good | Excellent | 280,000 | 370 | 444 |
| Example 24 | Good | Excellent | 280,000 | 370 | 444 |
| Example 25 | Good~Fair | Fair | 190,000 | 370 | 444 |
| Example 26 | Good | Excellent | 280,000 | 370 | 444 |
| Example 27 | Good | Excellent | 280,000 | 370 | 444 |
| Example 28 | Good | Excellent | 280,000 | 370 | 444 |
| Example 29 | Good | Fair | 240,000 | 330 | 0 |
| Example 30 | Good | Good | 230,000 | 330 | 396 |
| Example 31 | Good | Good | 250,000 | 335 | 402 |
| Example 32 | Good | Good | 250,000 | 360 | 432 |
| Example 33 | Good | Good | 230,000 | 350 | 420 |

TABLE 2-continued

|  | Ink Rinsing Property | Printing Transfer-ability | Engraving Depth (μm) | | |
|---|---|---|---|---|---|
|  |  |  | Durability (m) | CO₂ laser | IR laser (FC-LD) |
| Example 34 | Good | Good | 230,000 | 350 | 420 |
| Example 35 | Good | Good | 230,000 | 340 | 408 |
| Example 36 | Good | Good | 250,000 | 340 | 408 |
| Comparative Example 1 | Poor | Fair | 180,000 | 290 | 348 |
| Comparative Example 2 | Poor | Fair | 200,000 | 280 | 336 |
| Comparative Example 3 | Poor | Poor | 170,000 | 260 | 0 |
| Comparative Example 4 | Poor | Poor | 40,000 | 320 | 384 |

Here, since the resin composition for laser engraving in Examples 1, 22, and 29 did not include a photothermal conversion agent, engraving was not able to be carried out by an IR laser.

What is claimed is:

1. A process for producing a relief printing plate precursor for laser engraving comprising:
   a layer formation step of forming a relief-forming layer from a resin composition for laser engraving; and
   a crosslinking step of crosslinking the relief-forming layer by light, heat, or both to thus obtain a relief printing plate precursor having a crosslinked relief-forming layer,
   wherein the resin composition for laser engraving comprises (Component A) an acrylic block copolymer, (Component B) a crosslinking agent, and (Component C) a crosslinking catalyst,
   Component A is a copolymer which includes only two or more acrylic blocks, And
   the content of a binder polymer other than Component A in the resin composition is less than 10 wt % of Component A.

2. The process for producing a relief printing plate precursor for laser engraving according to claim 1, wherein the crosslinking step is a step of crosslinking the relief-forming layer by heat to thus obtain a relief printing plate precursor having a crosslinked relief-forming layer.

3. A process for making a relief printing plate, comprising:
   a layer formation step of forming a relief-forming layer from a resin composition for laser engraving; and
   a crosslinking step of crosslinking the relief-forming layer by light, heat, or both to thus obtain a relief printing plate precursor having a crosslinked relief-forming layer; and
   an engraving step of laser-engraving the relief printing plate precursor having the crosslinked relief-forming layer to form a relief layer,
   wherein the resin composition for laser engraving comprises (Component A) an acrylic block copolymer, (Component B) a crosslinking agent, and (Component C) a crosslinking catalyst,
   Component A is a copolymer which includes only two or more acrylic blocks, and
   the content of a binder polymer other than Component A in the resin composition is less than 10 wt % of Component A.

4. The process for making a relief printing plate according to claim 3, wherein the crosslinking step is a step of crosslinking the relief-forming layer by heat to thus obtain a relief printing plate precursor having the crosslinked relief-forming layer.

5. A relief printing plate having a relief layer which is manufactured by the making method according to claim 3.

6. The relief printing plate according to claim 5, wherein the thickness of the relief layer is at least 0.05 mm but no greater than 10 mm.

7. The relief printing plate according to claim 5, wherein Shore A hardness of the relief layer at 25° C. is at least 50° but no greater than 90°.

8. The process for producing a relief printing plate precursor for laser engraving according to claim 1, wherein the resin composition for laser engraving further comprises (Component D) a photothermal conversion agent which can absorb light with a wavelength of 700 to 1,300 nm.

9. The process for producing a relief printing plate precursor for laser engraving according to claim 1, wherein the resin composition for laser engraving further comprises (Component E) a plasticizer.

10. The process for producing a relief printing plate precursor for laser engraving according to claim 1, wherein said Compound B is a compound having a hydrolysable silyl group, a silanol group, or both.

11. The process for producing a relief printing plate precursor for laser engraving according to claim 1, wherein said Component B is a polyfunctional ethylenically unsaturated compound.

12. The process for producing a relief printing plate precursor for laser engraving according to claim 1, wherein said Component B is a compound which has two or more cyclic structures selected from the group consisting of an epoxy ring, an oxetane ring, and a 5-membered carbonate ring.

13. The process for producing a relief printing plate precursor for laser engraving according to claim 1, wherein among the two or more glass transition temperatures which exist in Component A, at least one is less than 25° C.

14. The process for producing a relief printing plate precursor for laser engraving according to claim 1, wherein the resin composition for laser engraving does not include a binder polymer other than Component A.

15. The process for producing a relief printing plate precursor for laser engraving according to claim 1, wherein said Component A is a triblock copolymer of the general structure A-B-A, wherein A and B represents different blocks.

16. The process for producing a relief printing plate precursor for laser engraving according to claim 1, wherein said Component A is a block copolymer obtained by copolymerization of at least two monomers selected from the group consisting of 2-hydroxyethyl (meth)acrylate, 2-hydroxypropyl (meth)acrylate, 4-hydroxybutyl (meth)acrylate, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-hexyl (meth)acrylate, 2-ethylhexyl (meth)acrylate, acetoxyethyl (meth)acrylate, phenyl (meth)acrylate, 2-methoxyethyl (meth)acrylate, 2-ethoxyethyl (meth)acrylate, 2-(2-methoxyethoxy)ethyl (meth)acrylate, cyclohexyl (meth)acrylate, benzyl (meth)acrylate, diethylene glycol monomethyl ether (meth)acrylate, diethylene glycol monoethyl ether (meth)acrylate, diethylene glycol monophenyl ether (meth)acrylate, triethylene glycol monomethyl ether (meth)acrylate, triethylene glycol monoethyl ether (meth)acrylate, dipropylene glycol monomethyl ether (meth)acrylate, polyethylene glycol monomethyl ether (meth)acrylate, polypropylene glycol monomethyl ether (meth)acrylate, monomethyl ether (meth)acrylate of a copolymer of ethylene glycol and propylene glycol, N,N-dimethylaminoethyl (meth)acrylate, N,N-diethylaminoethyl (meth)acrylate, and N,N-dimethylaminopropyl (meth)acrylate.

17. The process for producing a relief printing plate precursor for laser engraving according to claim 1, wherein said Component A is a block copolymer obtained by carrying out copolymerization of 2-hydroxyethyl (meth)acrylate, 2-hydroxypropyl (meth)acrylate, 4-hydroxybutyl (meth)acrylate, ethyl (meth)acrylate, n-propyl (meth)acrylate, isopropyl (meth)acrylate and/or n-butyl (meth)acrylate, by using methyl (meth)acrylate as an essential component.

18. The process for producing a relief printing plate precursor for laser engraving according to claim 1, wherein said Component A is a block copolymer selected from the group consisting of poly(methyl methacrylate)-poly(n-butyl acrylate)-poly(methyl methacrylate)triblock copolymer, poly(methyl methacrylate)-poly(n-butyl methacrylate)-poly(methyl methacrylate)triblock copolymer, and poly(methyl methacrylate)-poly(n-butyl acrylate)diblock copolymer.

* * * * *